(12) United States Patent
Sumi et al.

(10) Patent No.: US 9,862,162 B2
(45) Date of Patent: Jan. 9, 2018

(54) RESIN PANEL

(71) Applicant: KYORAKU CO., LTD., Kyoto (JP)

(72) Inventors: Takehiko Sumi, Kyoto (JP); Kiyotaka Kawai, Kyoto (JP)

(73) Assignee: KYORAKU CO., LTD., Kyoto (JP)

( * ) Notice: Subject to any disclaimer, the term of this patent is extended or adjusted under 35 U.S.C. 154(b) by 19 days.

(21) Appl. No.: 14/358,766

(22) PCT Filed: Nov. 9, 2012

(86) PCT No.: PCT/JP2012/079097
§ 371 (c)(1),
(2) Date: May 16, 2014

(87) PCT Pub. No.: WO2013/077198
PCT Pub. Date: May 30, 2013

(65) Prior Publication Data
US 2015/0086759 A1    Mar. 26, 2015

(30) Foreign Application Priority Data

Nov. 24, 2011 (JP) .................................. 2011-256265
Feb. 28, 2012 (JP) .................................. 2012-042290
Mar. 29, 2012 (JP) .................................. 2012-076487

(51) Int. Cl.
*B32B 3/06* (2006.01)
*B32B 27/08* (2006.01)
(Continued)

(52) U.S. Cl.
CPC ............ *B32B 3/06* (2013.01); *B29C 49/0031* (2013.01); *B29C 49/04* (2013.01); *B29C 49/20* (2013.01);
(Continued)

(58) Field of Classification Search
CPC .. B32B 3/06; B32B 3/263; B32B 3/30; B32B 27/08; B32B 2250/02; B32B 2250/24;
(Continued)

(56) References Cited

U.S. PATENT DOCUMENTS 4,246,734 A * 1/1981 Fogle, Jr. ................ B29C 49/20
108/901
4,478,899 A * 10/1984 Mayumi ................ B62D 25/02
296/63

(Continued)

FOREIGN PATENT DOCUMENTS

EP    1741543 A1    1/2007
EP    1864781 A1    12/2007
(Continued)

OTHER PUBLICATIONS

Japanese Office Action dated Jun. 19, 2015, in connection with JP Application No. 2012-042290 (7 pgs.).
(Continued)

*Primary Examiner* — Joanna Pleszczynska
(74) *Attorney, Agent, or Firm* — Maier & Maier, PLLC

(57) ABSTRACT

A resin panel of which contact surfaces of a rear wall to be in contact with another member are made unlikely to deform while reducing the weight of the resin panel. The panel includes a rear wall having a plurality of contact surfaces to be in contact with another member, and a front wall opposing the rear wall with an interval therebetween, the resin panel including a plurality of ribs obtained by indenting parts of the rear wall toward the front wall and welding the parts to an inner surface of the front wall, wherein a wall thickness of the front wall is generally equal to or smaller than a wall thickness of the rear wall.

14 Claims, 22 Drawing Sheets

(51) Int. Cl.
*B32B 3/30* (2006.01)
*B29C 49/20* (2006.01)
*B60R 13/01* (2006.01)
*B32B 37/00* (2006.01)
*B29C 49/00* (2006.01)
*B29C 49/04* (2006.01)
*B29C 49/42* (2006.01)

(52) U.S. Cl.
CPC .......... *B32B 27/08* (2013.01); *B32B 37/0076* (2013.01); *B60R 13/013* (2013.01); *B29C 49/041* (2013.01); *B29C 49/4205* (2013.01); *B29C 2049/0057* (2013.01); *B29C 2049/047* (2013.01); *B29C 2049/2013* (2013.01); *B29C 2049/2065* (2013.01); *B29C 2049/2078* (2013.01); *B32B 2250/02* (2013.01); *B32B 2250/24* (2013.01); *B32B 2553/00* (2013.01); *Y10T 428/24826* (2015.01)

(58) Field of Classification Search
CPC ..... Y10T 428/24562; Y10T 428/24826; B60R 13/01; B60R 13/02; B60R 13/013; B60R 13/011; E04C 2/38
USPC ................................. 428/174, 188, 166, 198
See application file for complete search history.

(56) References Cited

U.S. PATENT DOCUMENTS

| | | | |
|---|---|---|---|
| 5,234,756 A | 8/1993 | Kobama et al. | |
| 2001/0009703 A1 | 7/2001 | Toshikawa et al. | |
| 2005/0103239 A1 | 5/2005 | Neunzert et al. | |
| 2007/0065632 A1* | 3/2007 | Miyachi | B29C 45/14631 428/119 |
| 2007/0203300 A1* | 8/2007 | Sumi | C08L 53/00 525/240 |
| 2008/0169678 A1 | 7/2008 | Ishida et al. | |
| 2008/0254261 A1* | 10/2008 | Tamada | B29C 49/0005 428/166 |
| 2008/0261016 A1* | 10/2008 | Tamada | B29C 49/24 428/314.2 |
| 2009/0029083 A1 | 1/2009 | Endo et al. | |
| 2010/0104788 A1 | 4/2010 | Kitano et al. | |
| 2010/0247838 A1* | 9/2010 | Burpo | B29C 70/34 428/63 |
| 2011/0135862 A1 | 6/2011 | Sumi et al. | |
| 2011/0174198 A1* | 7/2011 | Seger | B65D 19/0012 108/57.27 |

FOREIGN PATENT DOCUMENTS

| | | |
|---|---|---|
| JP | 04-140114 A | 5/1992 |
| JP | 06-106608 A | 4/1994 |
| JP | 06-344431 A | 12/1994 |
| JP | 10-235720 A | 9/1998 |
| JP | 11-192654 A | 7/1999 |
| JP | 2001-198972 A | 7/2001 |
| JP | 2002-011776 A | 1/2002 |
| JP | 2006182208 A | 7/2006 |
| JP | 2006307228 A | 11/2006 |
| JP | 2008-055806 A | 3/2008 |
| JP | 2008265077 A | 11/2008 |
| JP | 2010-052705 A | 3/2010 |
| JP | 2010-155583 A | 7/2010 |
| JP | 2011136523 A | 7/2011 |
| WO | 2006/129730 A1 | 12/2006 |
| WO | 2008/123158 A1 | 10/2008 |
| WO | 2009136489 A1 | 11/2009 |
| WO | 2011/081224 A1 | 7/2011 |

OTHER PUBLICATIONS

Japanese Office Action dated Jun. 19, 2015, in connection with JP Application No. 2012-076487 (5 pgs.).
Extended European Search Report (EESR) dated Jun. 22, 2015, in connection with EP Application No. 12851791.9 (9 pgs.).
International Search Report for PCT/JP2012/079097; dated Feb. 12, 2013.
Korean Office Action dated Nov. 2, 2017, in connection with counterpart KR Application No. 10-2017-7015821 (16 pgs., including English translation).

* cited by examiner

RESIN PANEL

TECHNICAL FIELD

The present invention relates to a resin panel, for example, for use in a package tray, a deck board, a floor board, etc., installed in a luggage compartment of a vehicle.

BACKGROUND ART

There are technical documents filed by the present applicant, which disclose techniques for blow-molding a cylinder-shaped molten resin into a skin-covered panel (see, for example, Patent Document No. 1: Japanese Laid-Open Patent Publication No. 10-235720).

In Patent Document No. 1, by means of the blowing pressure during blow molding, a skin material is heat-welded to an outer surface of one wall portion, and the other wall portion is formed with inner ribs protruding to contact an inner surface of the one wall portion, thereby obtaining the skin-covered panel.

However, where the cylinder-shaped molten resin is used as in Patent Document No. 1, the molten resin is stretched in areas where the inner ribs are formed, and it is therefore necessary to increase the wall thickness of the cylinder-shaped molten resin in order to prevent formation of pinholes. This results in an increased weight of a final-molded-product skin-covered panel. Therefore, where the cylinder-shaped molten resin is used as in Patent Document No. 1, it may be difficult to reduce the weight and the thickness of the final-molded-product resin panel.

Normally, the thickness (meaning "wall thickness") of the cylinder-shaped molten resin (meaning "cylindrical parison") is uniform. When split molds are clamped together, the pressing force for pressing the cylindrical parison against the split molds will be uniform across the entire surface of the cylindrical parison. Therefore, the parison pressed against one split mold for forming depressed portions such as inner ribs is stretched because of the blow ratio in accordance with the depressed portions, thereby resulting in locally thinned portions. Since no depressed portions are formed on the other split mold, no thinned portions will be produced. As a result, the thickness of the cylindrical parison needs to be set taking into account the thinned portions to be produced on the one split mold side on which the depressed portions are to be formed, thereby resulting in an unnecessary thickness on the other split mold side. Therefore, where a cylindrical parison having a necessarily uniform wall thickness is used, the wall thickness of the wall portion where no depressed portions are formed is greater than the wall thickness of the wall portion where depressed portions are formed after blow molding, and it is therefore difficult to reduce the weight and the thickness of the final-molded-product resin panel.

Note that Patent Document No. 2 (Japanese Laid-Open Patent Publication No. 2010-155583) discloses a technique for obtaining a luggage board having a good mechanical strength property and rigidity even when the wall thickness of a resin panel of the luggage board is reduced for weight reduction.

In Patent Document No. 2, a rear wall is formed with a plurality of inner ribs integrally welded to a rear surface of a front wall, and a plurality of circular indentation-shaped round ribs integrally welded to the rear surface of the front wall are formed between the inner ribs of the rear wall. This makes it possible to obtain a required mechanical strength property and rigidity even when the average wall thickness of a resin wall of the luggage board is reduced to 1.5-2.5 mm for weight reduction. The average wall thickness of the resin wall of the luggage board is the average value between the wall thickness of the front wall and the wall thickness of the rear wall of the luggage board.

CITATION LIST

Patent Literature

Patent Document No. 1: Japanese Laid-Open Patent Publication No.

Patent Document No. 2: Japanese Laid-Open Patent Publication No. 2010-155583

SUMMARY OF INVENTION

Technical Problem

With Patent Document No. 2, however, since thinned portions are produced due to the formation of the inner ribs and round ribs on the rear wall side, the contact surface of the rear wall, which contacts another member, it is likely to deform or crack when used with the rear wall of the luggage board placed on the other member. Therefore, in order to make the contact surface unlikely to deform or crack, the thickness of the cylindrical parison needs to be set to a large thickness taking into account the thinned portions to be produced on the rear wall side. As a result, the average wall thickness of the resin wall of the luggage board obtained in Patent Document No. 2 cannot be less than 1.5 mm, and if it is made thinner than 1.5 mm, there will be a new problem that the contact surface is likely to deform or crack.

The present invention has been made in view of the above problems, and an object of the present invention is to provide a resin panel of which contact surfaces of a rear wall to be in contact with another member are made unlikely to deform or crack while reducing the weight of the resin panel, and a method for molding the resin panel.

Solution to Problem

In order to achieve the object, the present invention has the following features.

A resin panel according to the present invention is a resin panel including a rear wall having a plurality of contact surfaces to be in contact with another member, and a front wall opposing the rear wall with an interval therebetween, the resin panel including a plurality of ribs obtained by indenting parts of the rear wall toward the front wall and welding the parts to an inner surface of the front wall, wherein a wall thickness of the front wall is generally equal to or smaller than a wall thickness of the rear wall.

A resin panel according to the present invention is a resin panel including a rear wall having a plurality of contact surfaces to be in contact with another member, and a front wall opposing the rear wall with an interval therebetween, with the rear wall and the front wall being formed by the same resin, the resin panel including a plurality of ribs obtained by indenting parts of the rear wall toward the front wall and welding the parts to an inner surface of the front wall, wherein the front wall is lighter than the rear wall.

A molding method according to the present invention is a molding method for molding a resin panel including a rear wall having a plurality of contact surfaces to be in contact with another member, and a front wall opposing the rear wall with an interval therebetween, the method including:

an extrusion step of extruding a first molten resin sheet and a second molten resin sheet so that the first molten resin sheet forming the rear wall is located on one split mold side and the second molten resin sheet forming the front wall is located on an other split mold side, and so that a wall thickness of the second molten resin sheet is smaller than a wall thickness of the first molten resin sheet, wherein a cavity of the one split mold includes a plurality of protruding portions protruding toward the other split mold;

a shaping step of shaping the first molten resin sheet into a shape conforming to the cavity of the one split mold, and stretching the first molten resin sheet into a shape conforming to the protruding portion, thereby forming ribs; and a clamping process of clamping the pair of split molds together so as to weld together edges of the first molten resin sheet forming the rear wall and the second molten resin sheet forming the front wall and weld a tip of the ribs formed on the first molten resin sheet to the second molten resin sheet, thereby molding the resin panel.

Advantageous Effects of Invention

According to the present invention, it is possible to obtain a resin panel of which contact surfaces of a rear wall to be in contact with another member is made unlikely to deform or crack while reducing the weight of the resin panel.

BRIEF DESCRIPTION OF DRAWINGS

FIG. 1 (*a*) is a general perspective view of the resin panel 1. FIG. 1 (*b*) is a top view of the resin panel 1 shown in FIG. 1 (*a*). FIG. 1 (*c*) is a cross-sectional view taken along A-A' of FIG. 1 (*a*), (*b*). FIG. 1 (*d*) is a cross-sectional view taken along B-B' of FIG. 1 (*a*), (*b*).

FIG. 12 (*a*) is a general perspective view of the resin panel 1. FIG. 12 (*b*) is a top view of the resin panel 1 shown in (a). FIG. 12 (*c*) is a cross-sectional view taken along A-A' shown in FIGS. 12 (*a*) and (*b*). FIG. 12 (*d*) is a cross-sectional view taken along B-B' shown in FIG. 12 (*a*), (*b*).

DESCRIPTION OF EMBODIMENTS

Summary of Embodiment of Resin Panel 1 According to the Present Invention

Figure 1:
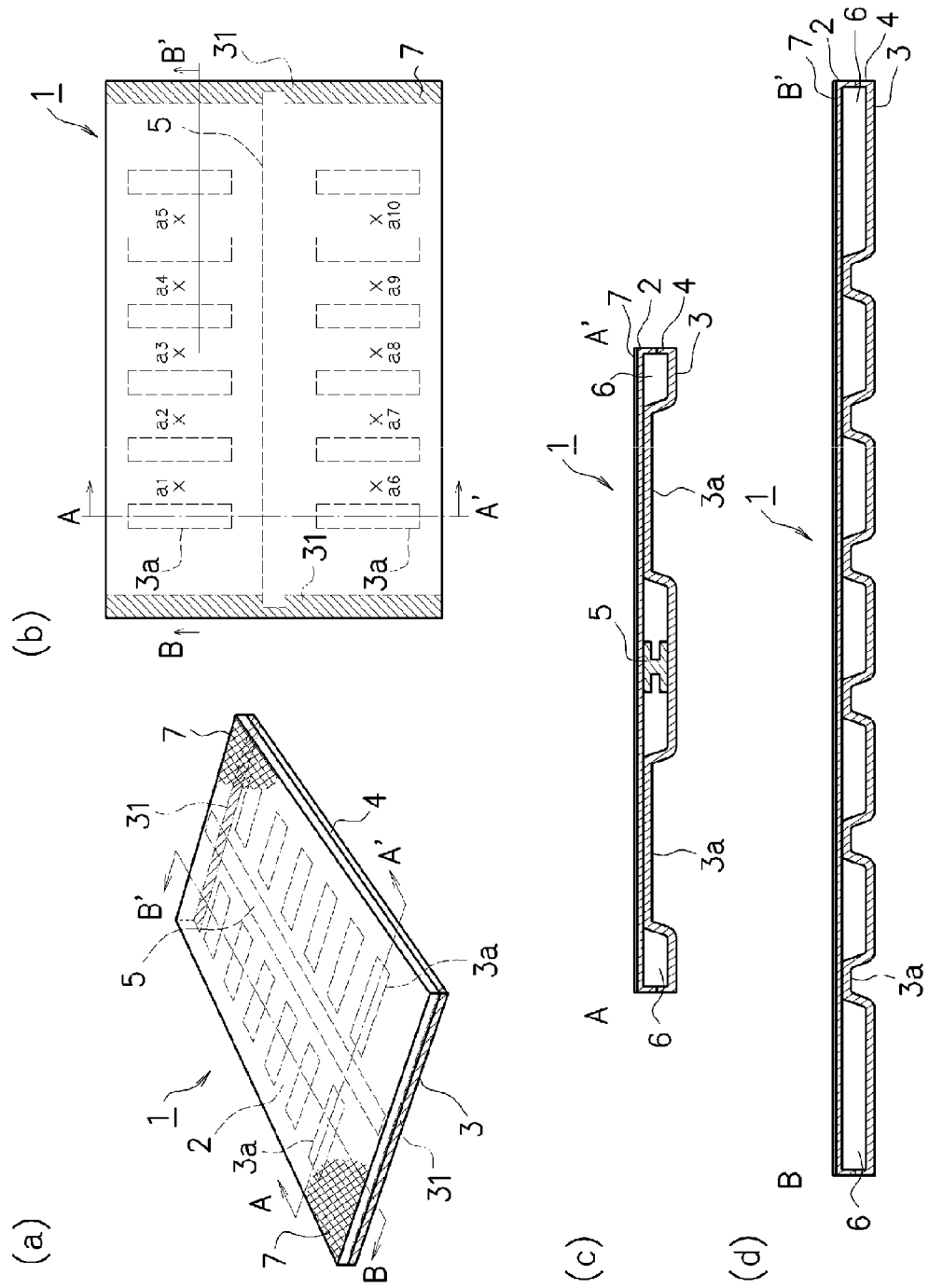
FIG. 1 is a diagram showing an example configuration of a resin panel 1 of a first embodiment.
Figure 6:
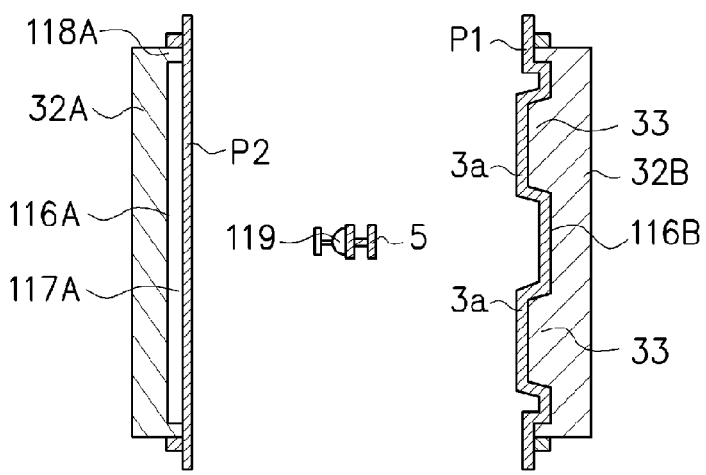
FIG. 6 is a fourth diagram showing an example step of molding the resin panel 1.
Figure 9:
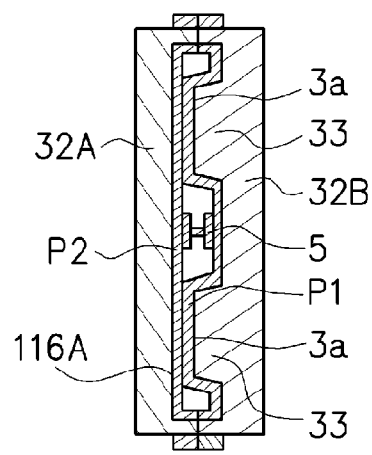
FIG. 9 is a seventh diagram showing an example step of molding the resin panel 1.

First, referring to FIG. 1, FIG. 2, FIG. 6 and FIG. 9, a summary of an embodiment of a resin panel 1 according to the present invention will be described. FIG. 1 shows an example configuration of the resin panel 1 according to the present invention, FIG. 2 shows an example configuration of a molding apparatus 60 for molding the resin panel 1 shown in FIG. 1, and FIG. 6 and FIG. 9 show a part of the molding process of the resin panel 1.

As shown in FIG. 1, the resin panel 1 according to the present invention is the resin panel 1 including a rear wall 3 having a plurality of contact surfaces 31 to contact with another member (not shown), and a front wall 2 opposing the rear wall 3 with an interval therebetween.

The resin panel 1 according to the present invention includes a plurality of ribs 3*a* obtained by indenting portions of the rear wall 3 toward the front wall 2 and welding them to the inner surface of the front wall 2, wherein the wall thickness of the front wall 2 is generally equal to or smaller than the wall thickness of the rear wall 3. The front wall 2 is lighter than the rear wall 3.

Figure 2:
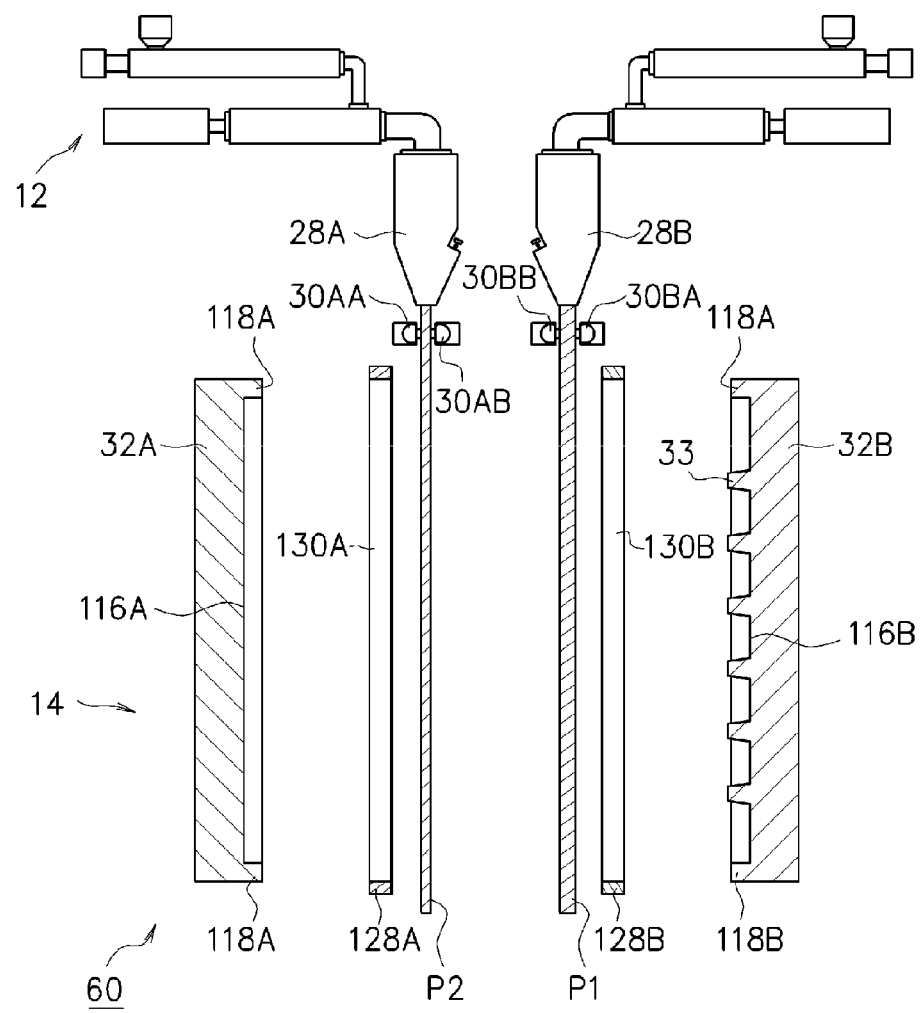
FIG. 2 is a diagram showing an example configuration of a molding apparatus 60 for molding the resin panel 1 of the first embodiment.

The resin panel 1 according to the present invention can be molded, for example, by using the molding apparatus 60 shown in FIG. 2. A clamper 14 of the molding apparatus 60 shown in FIG. 2 includes a plurality of protruding portions 33, provided in a cavity 116B of one split mold 32B, protruding toward another split mold 32A. With the protruding portions 33, the ribs 3a shown in FIG. 1 are formed.

When molding the resin panel 1 according to the present invention, first, a first molten resin sheet P1 and a second molten resin sheet P2 are extruded from an extruder 12 so that the first molten resin sheet P1 forming the rear wall 3 is located on the split mold 32B side and the second molten resin sheet P2 forming the front wall 2 on the split mold 32A side, with the wall thickness of the second molten resin sheet P2 being smaller than the wall thickness of the first molten resin sheet P1, as shown in FIG. 2. Therefore, where the rear wall 3 and the front wall 2 are formed by using the same resin, the front wall 2 of the final-molded-product resin panel 1 will be lighter than the rear wall 3.

Next, as shown in FIG. 6, the first molten resin sheet P1 is shaped into a shape conforming to the cavity 116B of the split mold 32B, and the first molten resin sheet P1 is stretched into a shape conforming to the protruding portions 33, forming the ribs 3a. Thus, the ribs 3a are formed on the first molten resin sheet P1 forming the rear wall 3.

Next, as shown in FIG. 9, a pair of split molds 32 are clamped together, and edges of the first molten resin sheet P1 forming the rear wall 3 and the second molten resin sheet P2 forming the front wall 2 are welded together, with the tip of the ribs 3a formed on the first molten resin sheet P1 being welded to the second molten resin sheet P2. Thus, the resin panel 1 shown in FIG. 1 can be molded.

Since the wall thickness of the front wall 2 of the resin panel 1 according to the present invention is generally equal to or smaller than the wall thickness of the rear wall 3, and the front wall 2 is lighter than the rear wall 3, the average wall thickness of the resin panel 1 (meaning the average value between the average wall thickness of the front wall 2 and the average wall thickness of the rear wall 3) can be, for example, less than 1.5 mm, and it is therefore possible to reduce the weight of the resin panel 1 and to make the contact surfaces 31 of the rear wall 3 unlikely to deform or crack.

For example, since a resin panel, which is a luggage board, of Patent Document No. 2 has thinned portions produced due to the formation of inner ribs and round ribs on the rear wall side, the contact surfaces of the rear wall, which contact another member, are likely to deform or crack when used with the rear wall side of the luggage board placed on the other member. Therefore, in order to make the contact surfaces unlikely to deform or crack, the thickness of the cylindrical parison needs to be set to a large thickness taking into account the thinned portions to be produced on the rear wall side. However, where the thickness of the cylindrical parison is set to a large thickness taking into account the thinned portions to be produced on the rear wall side, since no ribs are formed on the front wall side, there will be an unnecessary thickness on the front wall side and the front wall side will be unnecessarily heavy. As a result, the average wall thickness of the resin wall of the luggage board obtained in Patent Document No. 2 cannot be less than 1.5 mm.

In contrast, with the resin panel 1 according to the present invention, the average wall thickness of the wall portion of the resin panel 1 can be made less than 1.5 mm by extruding and molding so that the wall thickness of the second molten resin sheet P2 forming the front wall 2 is smaller than the wall thickness of the first molten resin sheet P1 forming the rear wall 3 so that the wall thickness of the front wall 2 is generally equal to or smaller than the wall thickness of the rear wall 3 and the front wall 2 is lighter than the rear wall 3 in the final-molded-product resin panel 1 shown in FIG. 1. As a result, it is possible to reduce the weight of the resin panel 1, and to make the contact surfaces 31 of the rear wall 3 unlikely to deform or crack. Therefore, it is possible to obtain the resin panel 1 of which the contact surfaces 31 of the rear wall 3 are unlikely to deform or crack while effectively reducing the weight of the resin panel 1 without deteriorating the mechanical strength of the resin panel 1.

The resin panel 1 according to the present invention can be made by using, as the material of the rear wall 3, a material having a higher moldability than the material of the front wall 2. For example, the base resin of the rear wall 3 and that of the front wall 2 may be the same, but the formulation should be such that the content of the filler for enhancing the rigidity is smaller in the material of the rear wall 3 than in the material of the front wall 2. The material of the rear wall 3 may be a material having a higher melt tension than the material of the front wall 2, with no filler contained therein.

Then, the ribs 3a of the rear wall 3 can be formed with a high quality without producing pinholes, or the like. As to the front wall 2, for example, by mixing a filler therein to enhance the rigidity, it is possible to obtain the front wall 2 having a superior durability that is unlikely to get scratched or crack even when the resin panel 1 is used as an exterior material. Embodiments of the resin panel 1 according to the present invention will now be described in detail with reference to the accompanying drawings.

First Embodiment

<Example Configuration of Resin Panel 1>

First, referring to FIG. 1, an example configuration of the resin panel 1 of the present embodiment will be described. FIG. 1 shows an example configuration of the resin panel 1, wherein FIG. 1(*a*) is a general perspective view of the resin panel 1, FIG. 1(*b*) is a top view of the resin panel 1 shown in FIG. 1(*a*), FIG. 1(*c*) is a cross-sectional view taken along A-A' of the resin panel 1 shown in FIG. 1(*a*), (*b*), and FIG. 1(*d*) is a cross-sectional view taken along B-B' of the resin panel 1 shown in FIG. 1(*a*), (*b*).

The resin panel 1 of the present embodiment is a resin panel, for example, for use in a package tray, a deck board, a floor board, etc., installed in a luggage compartment of an automobile, and includes the front wall 2, the rear wall 3, a peripheral wall 4 and a reinforcement 5, as shown in FIG. 1(*a*). As shown in FIG. 1(*c*), (*d*), in the resin panel 1 of the present embodiment, the front wall 2 and the rear wall 3 oppose each other with a predetermined interval therebetween, with the peripheral wall 4 connecting together the periphery of the front wall 2 and that of the rear wall 3. There are hollow portions 6 between the front wall 2 and the rear wall 3, and the reinforcement 5 is placed between the front wall 2 and the rear wall 3.

In the resin panel 1 of the present embodiment, a cosmetic member 7 for decorative purposes, or the like, is bonded to the surface of the front wall 2 as shown in FIG. 1(*a*), thus forming a layered structure of the rear wall 3, the front wall 2 and the cosmetic member 7 as shown in FIG. 1(c), (d). Note that no cosmetic member 7 may be bonded.

The resin panel 1 of the present embodiment has contact surfaces 31 on the rear wall 3, and end portions of the reinforcement 5 are placed on the contact surfaces 31 so as to bridge between the contact surfaces 31. The contact surfaces 31 are portions to be in contact with another member, for example when the resin panel 1 is placed on the other member in the automobile, and the resin panel 1 is placed on the other member with the contact surfaces 31 being in contact with the other member. Therefore, by placing the reinforcement 5 so as to bridge between the contact surfaces 31, it is possible to improve the mechanical strength of the resin panel 1. It is also possible to improve the mechanical strength for the direction perpendicular to the longitudinal direction of the reinforcement 5. Note that the shape and position of the contact surfaces 31 are not limited to the flat shape and the position shown in FIG. 1(a), (b), but may be changed to any shape and position depending on how the resin panel 1 is in contact with another member when the resin panel 1 is placed on the other member.

The resin panel 1 of the present embodiment includes a plurality of ribs 3a obtained by indenting portions of the rear wall 3 toward the front wall 2 and welding them to the inner surface of the front wall 2, thereby improving the rigidity and the mechanical strength of the resin panel 1. The rib 3a of the present embodiment has a bottom, and the bottom portion of the rib 3a is welded to the inner surface of the front wall 2. Note that the shape of the rib 3a is not limited to any particular shape, and may be formed in any shape depending on the specifications of the resin panel 1. The shape of the rib 3a may be any shape such as an elliptical shape, a rectangular shape, a polygonal shape, or the like. While slit ribs are provided as the ribs 3a in FIG. 1, inner ribs may be provided. The number of the ribs 3a is not limited to any particular number, and any number of ribs 3a may be provided depending on the shape of the resin panel 1. Note that the resin panel 1 shown in FIG. 1 is provided with rectangular ribs 3a non-parallel to the longitudinal direction of the reinforcement 5. Thus, it is possible to improve the mechanical strength in the direction parallel to the longitudinal direction of the reinforcement 5.

The resin panel 1 of the present embodiment includes a plurality of ribs 3a on the rear wall 3 having the contact surfaces 31 while reducing the weight of the resin panel 1. Therefore, in order to make the contact surfaces 31 of the rear wall 3 unlikely to deform or crack, the average wall thickness of the rear wall 3 is in the range of 1.1 mm or more and 1.7 mm or less. Since the front wall 2 has no ribs 3a unlike the rear wall 3, the average wall thickness of the front wall 2 is in the range of 0.7 mm or more and 1.2 mm or less. Thus, it is possible to obtain the resin panel 1 of which the contact surfaces 31 of the rear wall 3 to be in contact with another member are made unlikely to deform or crack while reducing the weight of the resin panel 1.

For example, if the average wall thickness of the rear wall 3 is less than 1.1 mm, the thickness will be even smaller in areas where the ribs 3a are formed, and therefore pinholes will likely be produced or the contact surfaces 31 will likely deform or crack. Therefore, the average wall thickness of the rear wall 3 is 1.1 mm or more. If the average wall thickness of the rear wall 3 is larger than 1.7 mm, it will be difficult to reduce the weight of the resin panel 1. Moreover, the difference in wall thickness between the rear wall 3 and the front wall 2 will increase, thereby varying the distance between the rear wall 3 and the front wall 2, and making the contact surfaces 31 likely to deform. Thus, the average wall thickness of the rear wall 3 is in the range of 1.1 mm or more and 1.7 mm or less. For substantially the same reasons as the rear wall 3, the front wall 2 is formed so that the average wall thickness of the front wall 2 is in the range of 0.7 mm or more and 1.2 mm or less. Thus, it is possible to obtain the resin panel 1 of which the contact surfaces 31 of the rear wall 3 to be in contact with another member is made unlikely to deform or crack while reducing the weight of the resin panel 1. Note that in the resin panel 1 of the present embodiment, since the average wall thickness of the rear wall 3 is in the range of 1.1 mm or more and 1.7 mm or less and the average wall thickness of the front wall 2 is in the range of 0.7 mm or more and 1.2 mm or less, the weight of the molded product, with no cosmetic member 7, is 2.5-4.2 $kg/m^2$, thus making it possible to reduce the weight of the resin panel 1 and to make the contact surfaces 31 of the rear wall 3 unlikely to deform or crack. Note however that the weight of the molded product of the front wall 2 is lighter than that of the rear wall 3.

Note that in the present embodiment, the average wall thickness of the front wall 2 or the rear wall 3 means the average value among wall thicknesses measured at at least 10 locations (note: 10 locations of a1-a10 shown in FIG. 1(b) where no ribs 3a are formed) defined at generally equal intervals along the longitudinal direction of the front wall 2 and the rear wall 3. For example, with the example configuration of the resin panel 1 shown in FIG. 1, it is the average value among wall thicknesses measured at 10 locations of positions a1-a10 of the front wall 2 where no ribs 3a are provided, as shown in FIG. 1(b). For the rear wall 3, it is the average value among wall thicknesses measured at positions opposing the positions a1-a10 of measurement for the front wall 2.

The rear wall 3 and the front wall 2 are respectively formed by using resin sheets P1 and P2 to be described later. The material used in the base resin of the resin sheets P1 and P2 forming the rear wall 3 and the front wall 2 is not limited to any particular material, and any known material can be used. For example, it is preferably an engineering plastic such as a polyethylene resin, a polypropylene resin, an ethylene-vinyl acetate copolymer, a vinyl chloride resin, an ABS resin (acrylonitrile-styrene-butadiene resin), a polyamide resin, a polystyrene resin, a polyester resin, a polycarbonate resin, a modified polyphenylene ether, or a mixed resin obtained by blending these materials together. In order to prevent variations in the wall thickness due to drawdown, neck-in, or the like, the front wall 2 and the rear wall 3 are preferably formed by using a resin material having a high melt tension, and they are on the other hand preferably formed by using a resin having a high liquidity so as to realize a good transferability and conformability to a mold.

For the front wall 2 and the rear wall 3, various fillers for enhancing the rigidity, such as glass fiber, carbon fiber, calcium carbonate, talc, mica, and the like, may be contained therein as necessary. Note however that the formulation should be such that the content of the filler for enhancing the rigidity in the material of the rear wall 3 is smaller than in the material of the front wall 2. For example, with a formulation where the front wall 2 contains 30 wt % of glass fiber as a filler, and the rear wall 3 contains no filler, the front wall 2 has a high rigidity and is unlikely to deform or crack, the rear wall 3 has a high moldability, and the protrusion/depression configuration of the ribs 3a can also be formed with a high quality with no pinhole production. Also with a formulation where the front wall 2 similarly contains 30 wt % of glass fiber while the content of glass fiber as a filler of the rear wall 3 is reduced by a predetermined proportion from that of the front wall 2, it is possible to obtain a similar effect depending on the proportion of the formulation. Also with a formulation where another filler for enhancing the rigidity is used, instead of glass fiber, it is possible to obtain a similar effect depending on the proportion of the formulation.

The material of the cosmetic member 7 is not limited to any particular material, and any known material can be used. For example, it can be selected as necessary from among a resin sheet of a knit fabric, a woven fabric or a non-woven fabric obtained by processing a fiber such as a natural fiber, a recycled fiber, a semi-synthetic fiber, a synthetic fibers and a blend thereof, or a thermoplastic elastomer (TPE), such as polyvinyl chloride (PVC), thermoplastic polyurethane elastomer (TPU) or thermoplastic polyolefin elastomer (TPO), or a thermoplastic resin, such as a polyethylene polyolefin resin, and a laminated sheet thereof.

The material of the reinforcement 5 is also not limited to any particular material, and any known material can be used. For example, a metal (e.g., aluminum) or a rigid plastic may be used. The shape of the reinforcement 5 is not limited to the shape shown in FIG. 1, and may be any shape. For example, it may be cylindrical, C-shaped, U-shaped, etc. Note however that in the resin panel 1 of the present embodiment, since the ribs 3a are formed on the rear wall 3, the reinforcement 5 needs to be placed in an area where no ribs 3a are formed.

<Example Method for Molding Resin Panel 1>

Next, referring to FIG. 2 to FIG. 10, an example method for molding the resin panel 1 of the present embodiment will be described. FIG. 2 shows an example configuration of the molding apparatus 60 for forming the resin panel 1, and FIG. 3 to FIG. 10 show example steps of molding the resin panel 1, showing resin sheets P and split molds 32 as viewed from the T-die 28 side of the extruder 12 shown in FIG. 2.

The resin panel 1 of the present embodiment can be molded by using the molding apparatus 60 shown in FIG. 2. The molding apparatus 60 shown in FIG. 2 includes the extruder 12 and the clamper 14 for forwarding the molten resin sheets P1, P2 having been extruded from the extruder 12 into the clamper 14, blow-molding the resin sheets P1, P2 in the clamper 14, and molding the resin panel 1 shown in FIG. 1. The resin sheet P1 forms the rear wall 3, and the resin sheet P2 forms the front wall 2.

Since the resin panel 1 of the present embodiment is formed with the ribs 3a on the rear wall 3, a plurality of protruding portions 33 for molding the ribs 3a are provided in the cavity 116B of the one split mold 32B for molding the rear wall 3 side, as shown in FIG. 2 to FIG. 10. The protruding portions 33 are shaped in accordance with the ribs 3a formed on the rear wall 3, and are provided in the cavity 116B so as to project toward the other split mold 32A forming the front wall 2 side. The protruding portions 33 shown in FIG. 2 are for forming the ribs 3a in the longitudinal direction of the resin panel 1 shown in FIG. 1, and the protruding portions 33 shown in FIG. 3 to FIG. 10 are for forming the ribs 3a in the lateral direction of the resin panel 1 shown in FIG. 1.

Since the resin panel 1 of the present embodiment is formed with the wall thickness of the rear wall 3 being relatively larger than that of the front wall 2, the wall thickness of the resin sheet P1 forming the rear wall 3 is set to be larger than that of the resin sheet P2 forming the front wall 2. An example method for molding the resin panel 1 of the present embodiment will now be described in detail.

Figure 3:
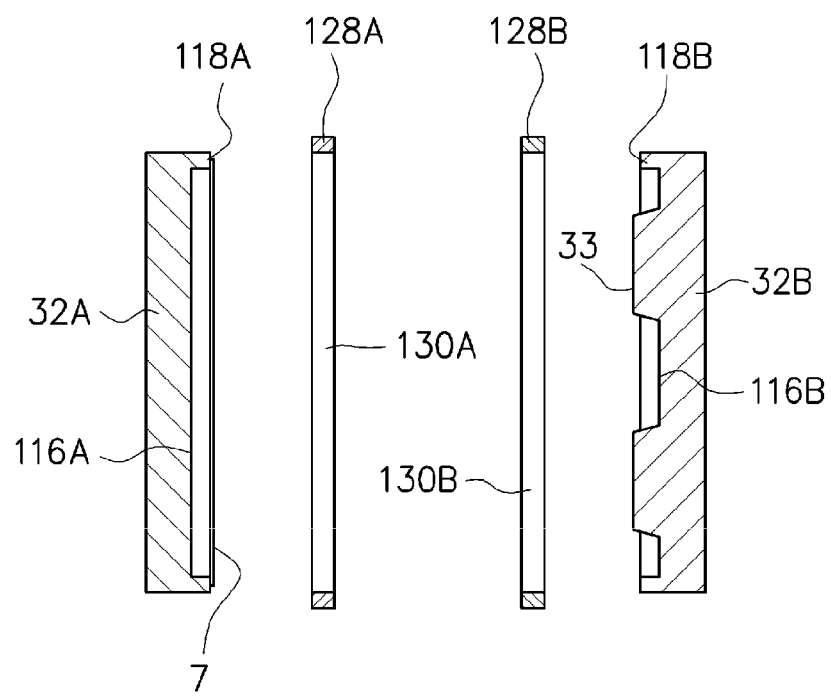
FIG. 3 is a first diagram showing an example step of molding the resin panel 1.

As shown in FIG. 1, where the cosmetic member 7 is provided on the surface of the front wall 2, a sheet-shaped cosmetic member 7 is temporarily tacked with a tacking pin (not shown) provided on the split mold 32A so as to cover a cavity 116A of the split mold 32A as shown in FIG. 3.

Next, as shown in FIG. 2, the resin sheets P1, P2 are extruded from the T-dies 28 of the extruder 12, and the extruded resin sheets P1 P2 are passed through a pair of rollers 30 to adjust the wall thickness of the resin sheets P1, P2 so that the extruded resin sheets P1, P2 hang down between the pair of split molds 32.

The extrusion power of the extruder 12 is appropriately selected taking into account the size of the resin panel 1 to be molded and so as to prevent drawdown or neck-in of the resin sheets P1, P2. More specifically, the amount of extrusion per shot of intermittent extrusion is preferably 1-10 kg, and the extrusion speed of the resin sheets P1, P2 through the extrusion slits is hundreds of kg/h or more, and more preferably 700 kg/h or more. In order to prevent drawdown or neck-in of the resin sheets P1, P2, the extrusion step of the resin sheets P1, P2 is preferably as short as possible, and the extrusion step is generally completed preferably within 40 seconds and more preferably within 10-20 seconds though it depends on the type of the resin, the MFR value, and the MT value. Therefore, the amount of extrusion of the resin sheets P1, P2 per unit area and time through the extrusion slit is 50 kg/h cm$^2$ or more, and more preferably 150 kg/h cm$^2$ or more.

The extruder 12 of the present embodiment extrudes so that the wall thickness of the second molten resin sheet P2 forming the front wall 2 is smaller than the wall thickness of the first molten resin sheet P1 forming the rear wall 3 so that the wall thickness of the front wall 2 is generally equal to or smaller than the wall thickness of the rear wall 3 and the front wall 2 is lighter than the rear wall 3. For example, the wall thickness of the resin sheet P2 forming the front wall 2 is adjusted so that the average wall thickness of the front wall 2 of the final-molded-product resin panel 1 is in the range of 0.7 mm or more and 1.2 mm or less. The resin sheet P1 forming the rear wall 3 is adjusted so that the average wall thickness of the rear wall 3 of the final-molded-product resin panel 1 is in the range of 1.1 mm or more and 1.7 mm or less. The wall thickness of the resin sheets P1, P2 can be changed by adjusting the gaps of the extrusion slits, the interval between the rollers 30, and the speed of the rollers 30.

Note however that in order to prevent the wall thickness from varying due to drawdown, neck-in, or the like, the resin sheets P1, P2 are preferably formed by using a resin material having a high melt tension, and they are on the other hand preferably formed by using a resin material having a high liquidity so as to realize a good transferability and conformability to the split mold 32. For example, the base resin of the resin sheets P1, P2 may be: a polyolefin (e.g., polypropylene, high-density polyethylene), which is a homopolymer or a copolymer of olefins such as ethylene, propylene, butane, isoprene pentene and methylpentene, and of which the MFR at 230° C. (MFR was measured in conformity with JIS K-7210 at a test temperature of 230° C. and a test load of 2.16 kg) is 3.0 g/10 min or less and more preferably 0.3-1.5 g/10 min; or an amorphous resin such as acrylonitrile-butadiene-styrene copolymer, polystyrene, high-impact polystyrene (HIPS resin), acrylonitrile-styrene copolymer (AS resin), of which the MFR at 200° C. (MFR was measured in conformity with JIS K-7210 at a test temperature of 200° C. and a test load of 2.16 kg) is 3.0-60 g/10 min and more preferably 30-50 g/10 min and the melt tension at 230° C. (a strand was extruded through an orifice having a diameter of 2.095 mm and a length of 8 mm with a preheat temperature of 230° C. and at an extrusion speed of 5.7 mm/min, and the tension of the strand was measured using a melt tension tester from Toyo Seiki Seisaku-Sho Ltd. while being taken up onto a roller having a diameter of 50 mm at a winding speed of 100 rpm) is 50 mN or more and more preferably 120 mN or more.

In order to prevent the resin sheets P1, P2 from cracking due to impact, it is preferred that less than 30 wt %, preferably less than 15 wt % of a hydrogenated styrene-based thermoplastic elastomer is added. Specifically, the hydrogenated styrene-based thermoplastic elastomer is preferably a styrene-ethylene-butylene-styrene block copolymer, a styrene-ethylene-propylene-styrene block copolymer, a hydrogenated styrene-butadiene rubber and a mixture thereof, of which the styrene content is less than 30 wt %, preferably less than 20 wt %, and of which the MFR at 230° C. (MFR was measured in conformity with JIS K-7210 at a test temperature of 230° C. and a test load of 2.16 kg) is 1.0-10 g/10 min, preferably 5.0 g/10 min or less and 1.0 g/10 min or more.

Moreover, as necessary, the resin sheets P1, P2 may contain various fillers for enhancing the rigidity, such as silica, mica, talc, calcium carbonate, glass fiber, carbon fiber, and the like. Note however that a formulation is preferably such that the content of the filler for enhancing the rigidity is smaller in the first molten resin sheet P1 forming the rear wall 3 than in the second molten resin sheet P2 forming the front wall 2.

Specifically, the second molten resin sheet P2 forming the front wall 2 contains a filler for enhancing the rigidity by 50 wt % or less, preferably 30-40 wt %, with respect to the base resin. For the first molten resin sheet P1 forming the rear wall 3, the content of such a filler for enhancing the rigidity is set to be less than or equal to a predetermined amount with which pinholes will not be produced when the first molten resin sheet P1 is shaped into the protrusion/depression configuration of the ribs 3a.

Fillers for enhancing the rigidity include inorganic or organic fillers, and in order to obtain reinforcing effects, fibrous fillers include glass fiber, potassium titanate whisker, carbon fiber, and the like, plate-shaped fillers include talc, mica, montmorillonite, and the like, and granular fillers include calcium carbonate, and the like. Needle-shaped fillers include magnesium, and the like. Calcium carbonate can provide reinforcing effects such as the flexural modulus, the bending strength, the heat distortion temperature and the dimensional stability. Talc and montmorillonite can provide reinforcing effects such as the flexural modulus, the bending strength, the heat distortion temperature and the dimensional stability. Mica can provide reinforcing effects such as the flexural modulus, the bending strength, the heat distortion temperature, the dimensional stability and the compressive strength. Glass fiber, potassium titanate whisker and carbon fiber can provide reinforcing effects such as the flexural modulus, the bending strength, the tensile modulus, the heat distortion temperature, the dimensional stability and the compressive strength. Thus, in order to obtain reinforcing effects, it is preferred to use a fibrous filler.

The fibrous filler may be, for example, a short fiber having a fiber length of 0.2-0.5 mm, or a long fiber having a fiber length of 3-12 mm. Note that where a fibrous filler is used, the fibrous filler will be oriented in the extrusion direction of the resin sheets P1, P2, and it is preferred to extrude the resin sheets P1, P2 so that the fibrous filler is oriented in the same direction as the reinforcement 5. Thus, it is possible to reduce the weight of the reinforcement 5 in the same direction as the orientation of the fibrous filler.

Moreover, the resin sheets P1, P2 may include various additives such as a plasticizer, a stabilizer, a colorant, an antistatic agent, a flame retardant and a foaming agent.

The molding apparatus 60 of the present embodiment is capable of drawing and thinning the resin sheets P1, P2 by downwardly forwarding the resin sheets P1, P2 sandwiched between the pair of rollers 30 by rotating the pair of rollers 30, and it is possible to prevent drawdown or neck-in by adjusting, by using the rotational speed of the pair of rollers 30, the relative speed difference between the extrusion speed of the resin sheets P1, P2 and the forwarding speed at which the resin sheets P1, P2 are downwardly forwarded by the pair of rollers 30. Thus, it is possible to reduce limitations on the type of the resin, particularly on the MFR value, the MT value, or the amount of extrusion per unit time.

Figure 4:
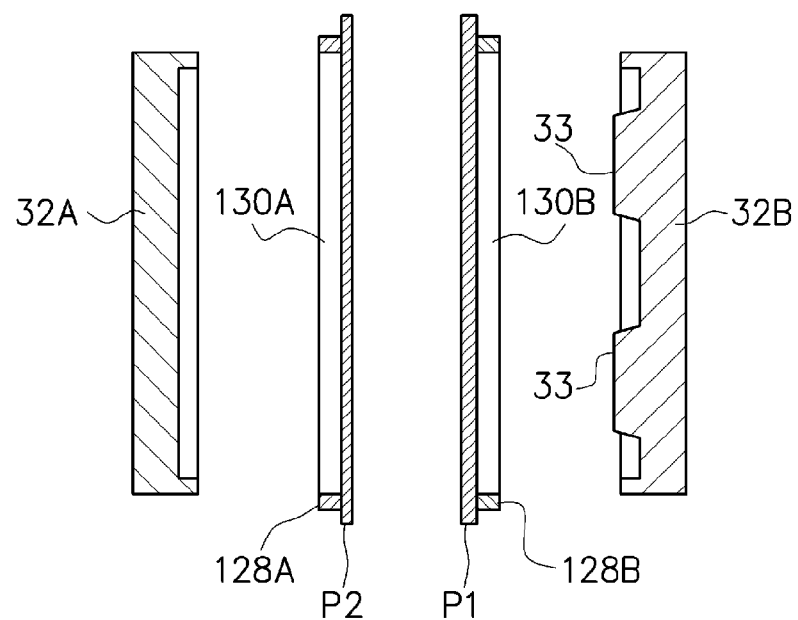
FIG. 4 is a second diagram showing an example step of molding the resin panel 1.

With the molding apparatus 60 of the present embodiment, the resin sheets P1, P2 are placed between the split molds 32, and a frame member 128 is moved by a frame member driver (not shown) toward the corresponding resin sheets P1, P2 so that the frame member 128 abuts against the resin sheets P1, P2, thus holding the resin sheets P1, P2 with the frame member 128, as shown in FIG. 4. The frame member 128 has an opening 130, and the resin sheets P1, P2 are held by the frame member 128.

Figure 5:
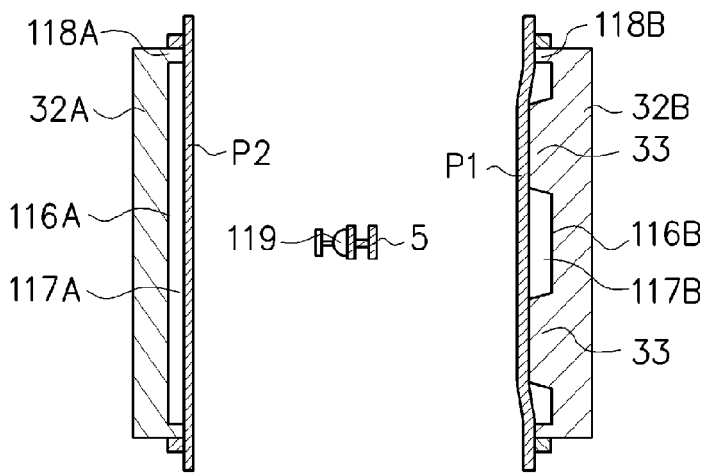
FIG. 5 is a third diagram showing an example step of molding the resin panel 1.

Next, the frame member 128 is moved toward the split mold 32 so that the resin sheets P1, P2 abut against pinch-off portions 118 of the split molds 32 as shown in FIG. 5, thereby forming closed spaces 117 by the resin sheets P1, P2, the pinch-off portions 118 and cavities 116. The reinforcement 5 (see FIG. 1) held by a suction pad 119 of a manipulator (not shown) is inserted between the split molds 32 as shown in FIG. 5. Note that the reinforcement 5 shown in FIG. 5 represents the reinforcement 5 shown in FIG. 1(c). The position at which the reinforcement 5 is held by the suction pad 119 is not limited to any particular position, and may be held at any position.

Next, a closed space 117B is evacuated through the split mold 32B, and the resin sheet P1 forming the rear wall 3 is pressed against the cavity 116B, thereby shaping the resin sheet P1 forming the rear wall 3 into a shape conforming to the protrusion/depression surface of the cavity 116B, as shown in FIG. 6. An evacuation chamber (not shown) is provided inside the split mold 32B of the present embodiment, and the evacuation chamber communicates with the cavity 116B via a suction hole so that suction from the evacuation chamber through the suction hole sucks the resin sheet P1 toward the cavity 116B and shapes the resin sheet P1 into a shape conforming to the outer surface of the cavity 116B. With the protruding portions 33 provided on the outer surface of the cavity 116B, the ribs 3a are formed on the outer surface of the resin sheet P1. Therefore, a plurality of ribs 3a are formed on the resin sheet P1.

Figure 7:
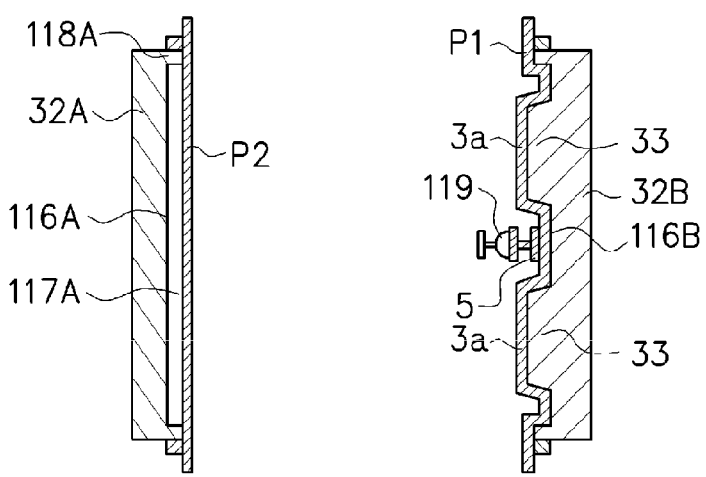
FIG. 7 is a fifth diagram showing an example step of molding the resin panel 1.

The manipulator is moved toward the split mold 32B, and the reinforcement 5 is pressed against the resin sheet P1 sucked onto the cavity 116B of the split mold 32B, as shown in FIG. 7, thereby attaching the reinforcement 5 to the resin sheet P1. In this process, the reinforcement 5 is attached to the resin sheet P1 so that opposite ends of the reinforcement 5 are located on the contact surfaces 31 of the rear wall 3 (see FIG. 1).

Figure 8:
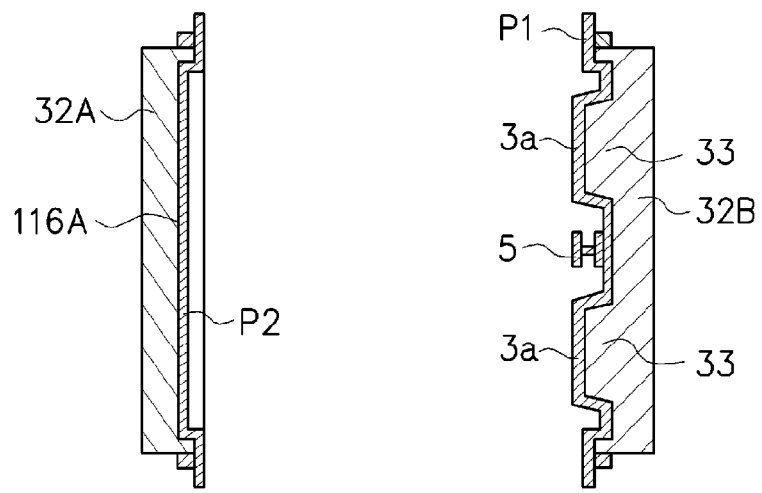
FIG. 8 is a sixth diagram showing an example step of molding the resin panel 1.

Next, the suction pad 119 is detached from the reinforcement 5, the manipulator is pulled out from between the two split molds 32, and the resin sheet P2 forming the front wall 2 is pressed against the cavity 116A, thereby shaping the resin sheet P2 into a shape conforming to the cavity 116A, as shown in FIG. 8. Note that an evacuation chamber (not shown) is provided also inside the split mold 32A of the present embodiment, and the evacuation chamber communicates with the cavity 116A through the suction hole so that suction from the evacuation chamber through the suction hole sucks the resin sheet P2 toward the cavity 116A and shapes the resin sheet P2 into a shape conforming to the outer surface of the cavity 116A.

Next, the two split molds 32 are clamped together using a mold driver, and the reinforcement 5 and the ribs 3a are pressed against the resin sheet P2 being sucked onto the cavity 116A of the split mold 32A, as shown in FIG. 9, thereby attaching the reinforcement 5 and the ribs 3a to the resin sheet P2. The peripheries of the two resin sheets P1, P2 are welded together, thus forming a parting line PL.

Note that in the present embodiment, when the resin panel 1 in which the reinforcement 5 and the resin sheets P1, P2 are integrated together is formed by clamping with the split molds 32, it is preferred to compress together the reinforcement 5 and the resin sheets P1, P2 with the split molds 32. Thus, it is possible to further improve the adhesive strength between the reinforcement 5 and the resin sheets P1, P2.

Through the steps described above, the resin panel 1 is completed, which is molded by sandwiching the reinforcement 5 between the molten resin sheets P1, P2.

Figure 10:
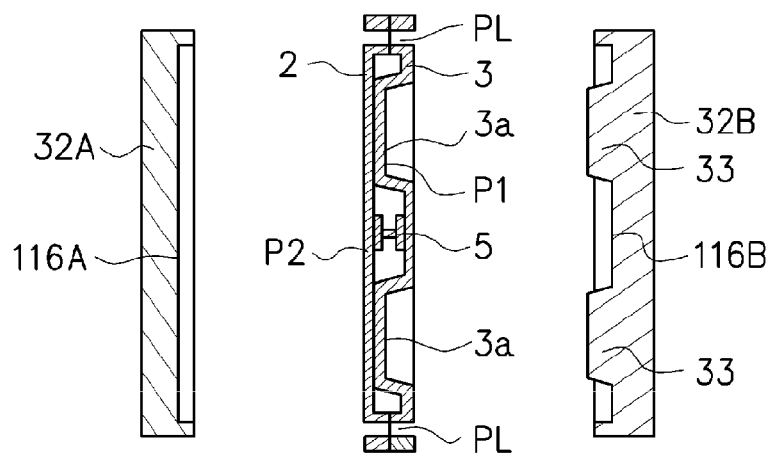
FIG. 10 is an eighth diagram showing an example step of molding the resin panel 1.

Next, as shown in FIG. 10, the two split molds 32 are opened, and the completed resin panel 1 is released from the cavity 116, and burrs formed around the parting line PL are removed. Thus, molding of the resin panel 1 shown in FIG. 1 is completed.

Functions/Effects of Resin Panel 1 of Present Embodiment

Thus, when the resin panel 1 of the present embodiment is molded, first, as shown in FIG. 2, the material is extruded from the extruder 12 so that the wall thickness of the second molten resin sheet P2 forming the front wall 2 is smaller than the wall thickness of the first molten resin sheet P1 forming the rear wall 3 so that the wall thickness of the front wall 2 is generally equal to or smaller than the wall thickness of the rear wall 3 and the front wall 2 is lighter than the rear wall 3 in the final-molded-product resin panel 1 shown in FIG. 1.

Next, as shown in FIG. 6, the first resin sheet P1 is shaped into a shape conforming to the cavity 116B of the split mold 32B, stretching the first resin sheet P1 into a shape conforming to the protruding portion 33, thereby forming the ribs 3a. Thus, the ribs 3a are formed on the first resin sheet P1 forming the rear wall 3.

Next, as shown in FIG. 7, the reinforcement 5 is attached to the first resin sheet P1 with the ribs 3a formed thereon.

Next, as shown in FIG. 9, the pair of split molds 32 are clamped together so that the edges of the first resin sheet P1 forming the rear wall 3 and the second resin sheet P2 forming the front wall 2 are welded together, and the tips of the ribs 3a formed on the first resin sheet P1 are welded to the second resin sheet P2. The reinforcement 5 is attached to the second resin sheet P2. Thus, the resin panel 1 shown in FIG. 1 can be molded.

In the resin panel 1 of the present embodiment, the wall thickness of the front wall 2 is generally equal to or smaller than the wall thickness of the rear wall 3, and the front wall 2 is lighter than the rear wall 3; therefore, for example, it is possible to make the average wall thickness of the resin panel 1 (meaning the average value between the average wall thickness of the front wall 2 and the average wall thickness of the rear wall 3) less than 1.5 mm and to reduce the weight of the resin panel 1, and it is possible to make the contact surfaces 31 of the rear wall 3 unlikely to deform or crack.

Since the resin panel 1 is molded with the reinforcement 5 attached to the inner surface of the front wall 2 and the rear wall 3, it is possible to prevent misalignment of the reinforcement 5.

The formulation is such that the same base resin is used for the material of the rear wall 3 and the material of the front wall 2 and so that the content of the filler for enhancing the rigidity for the material of the rear wall 3 is less than that for the material of the front wall 2. Then, even when the resin sheet P1 forming the rear wall 3 is sucked onto the cavity 116B and shaped into a shape conforming to the protrusion/depression configuration on the surface of the cavity 116B for forming the ribs 3a, it can be molded with a high quality without producing pinholes, or the like. Moreover, the front wall 2 can be made unlikely to deform or crack by enhancing the rigidity thereof.

By molding the front wall 2 and the rear wall 3 using different materials, it is possible to select a lower-cost material for the rear wall 3, which cannot be seen from the user during use, while making the front wall 2 unlikely to deform or crack. Thus, by allowing for the selection of a low-cost material, it is possible to further reduce the cost of the resin panel 1.

Figure 11:
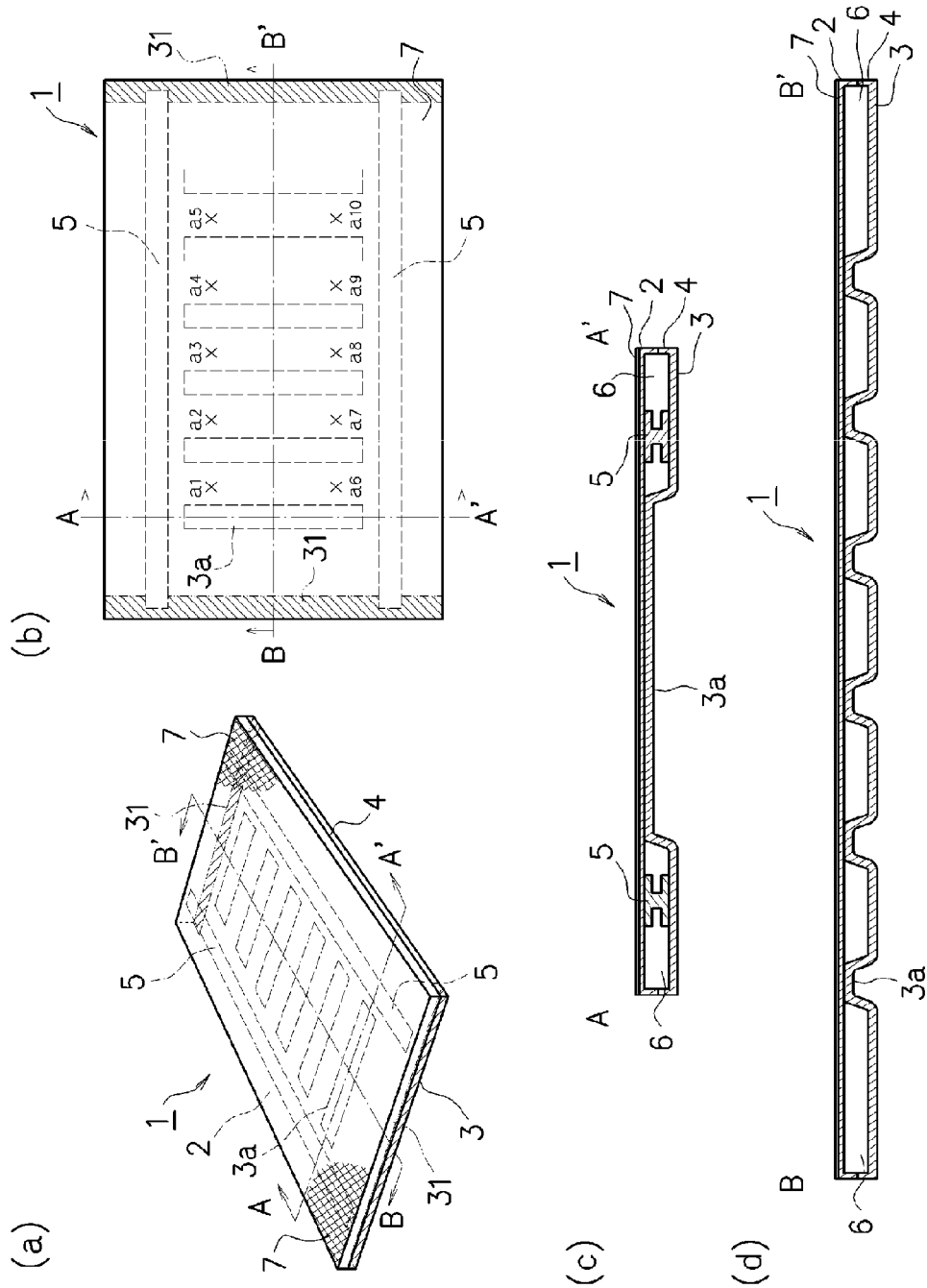
FIG. 11 is a diagram showing another example configuration of the resin panel 1 of the first embodiment.

Note that in the resin panel 1 of the embodiment described above, only one reinforcement 5 having a linear shape is placed as shown in FIG. 1. However, it is also possible to place a plurality of reinforcements 5 as shown in FIG. 11. The resin panel 1 shown in FIG. 11 includes two reinforcements 5 placed therein. It also includes six rectangular ribs 3a extending non-parallel to and between the reinforcements 5. Also with this configuration of the resin panel 1 shown in FIG. 11, the average wall thickness of the front wall 2 is 1.2 mm or less, and by making the average wall thickness of the rear wall 3 1.7 mm or less, it is possible to make the average wall thickness of the resin panel 1 (meaning the average value between the average wall thickness of the front wall 2 and the average wall thickness of the rear wall 3) less than 1.5 mm, thereby reducing the weight of the resin panel 1, and making the contact surfaces 31 unlikely to deform or crack.

The embodiment described above is directed to an example of a single resin panel 1. However, it is also possible to form, for example, a resin panel including a first resin panel and a second resin panel connected together via a hinge portion.

In the embodiment described above, the reinforcement 5 is placed inside the resin panel 1 by attaching the reinforcement 5 to the molten resin sheets P1, P2 and clamping them together. However, it is also possible to mold the resin panel 1, and then place the reinforcement 5 inside the resin panel 1 by inserting the reinforcement 5 from the side surface of the resin panel 1. Note however that while rectangular reinforcements 5 as shown in FIG. 1 and FIG. 11 can be inserted from the side surface of the molded resin panel 1, if a shape such as a ladder-shaped reinforcement unit including a plurality of reinforcements running in different directions is used, it is preferred to attach a ladder-shaped reinforcement unit to the molten resin sheets P1, P2 before molding as with the molding method of the embodiment described above.

For each example configuration of the embodiment described above, the front wall 2 is not limited to planar, but it is possible to similarly realize the present invention and obtain similar effects as long as it is a shape with smaller protrusions/depressions than the rear wall 3.

Second Embodiment

Next, the second embodiment will be described.

Figure 12:
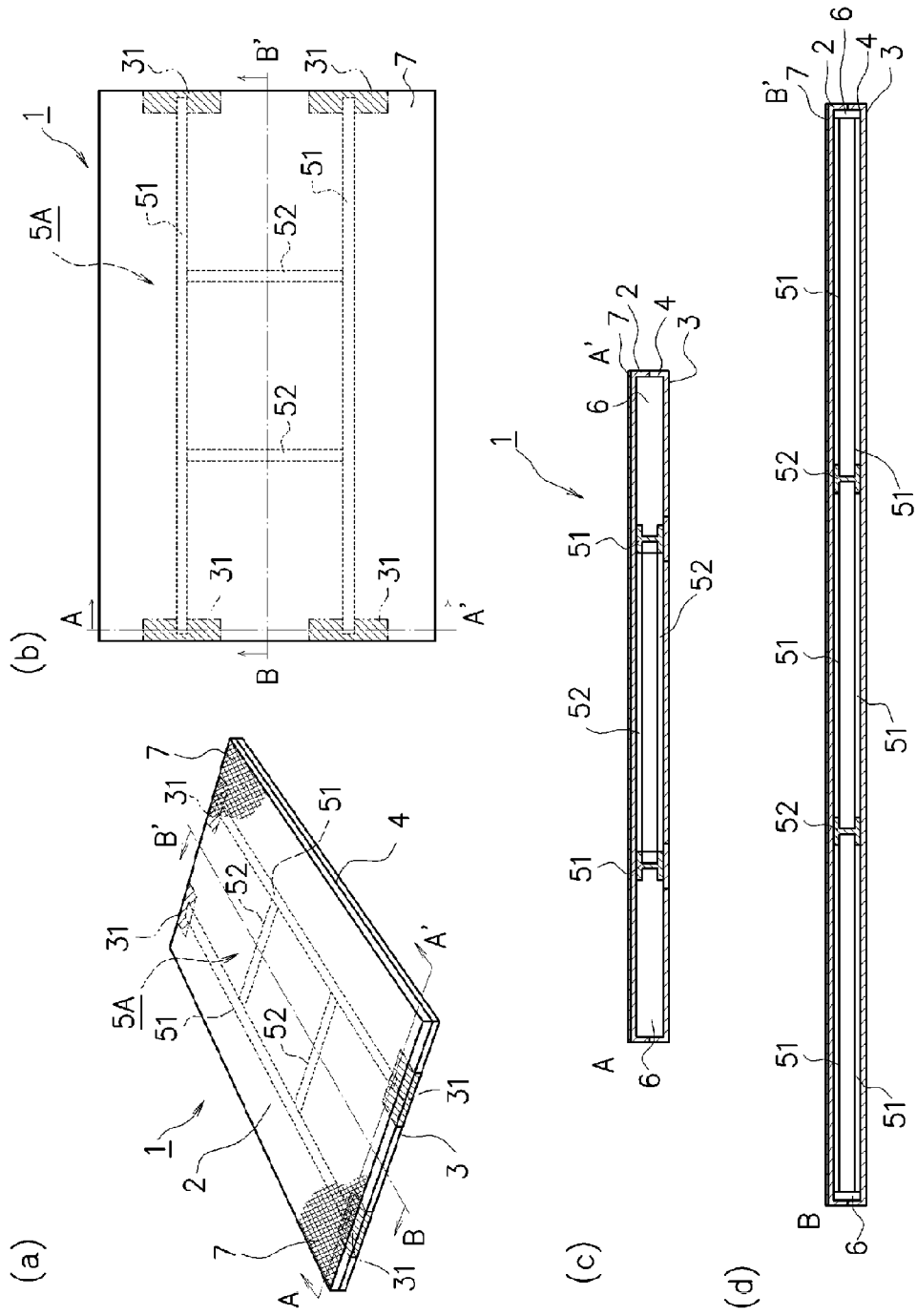
FIG. 12 is a diagram showing an example configuration of the resin panel 1 of a second embodiment.
Figure 33:
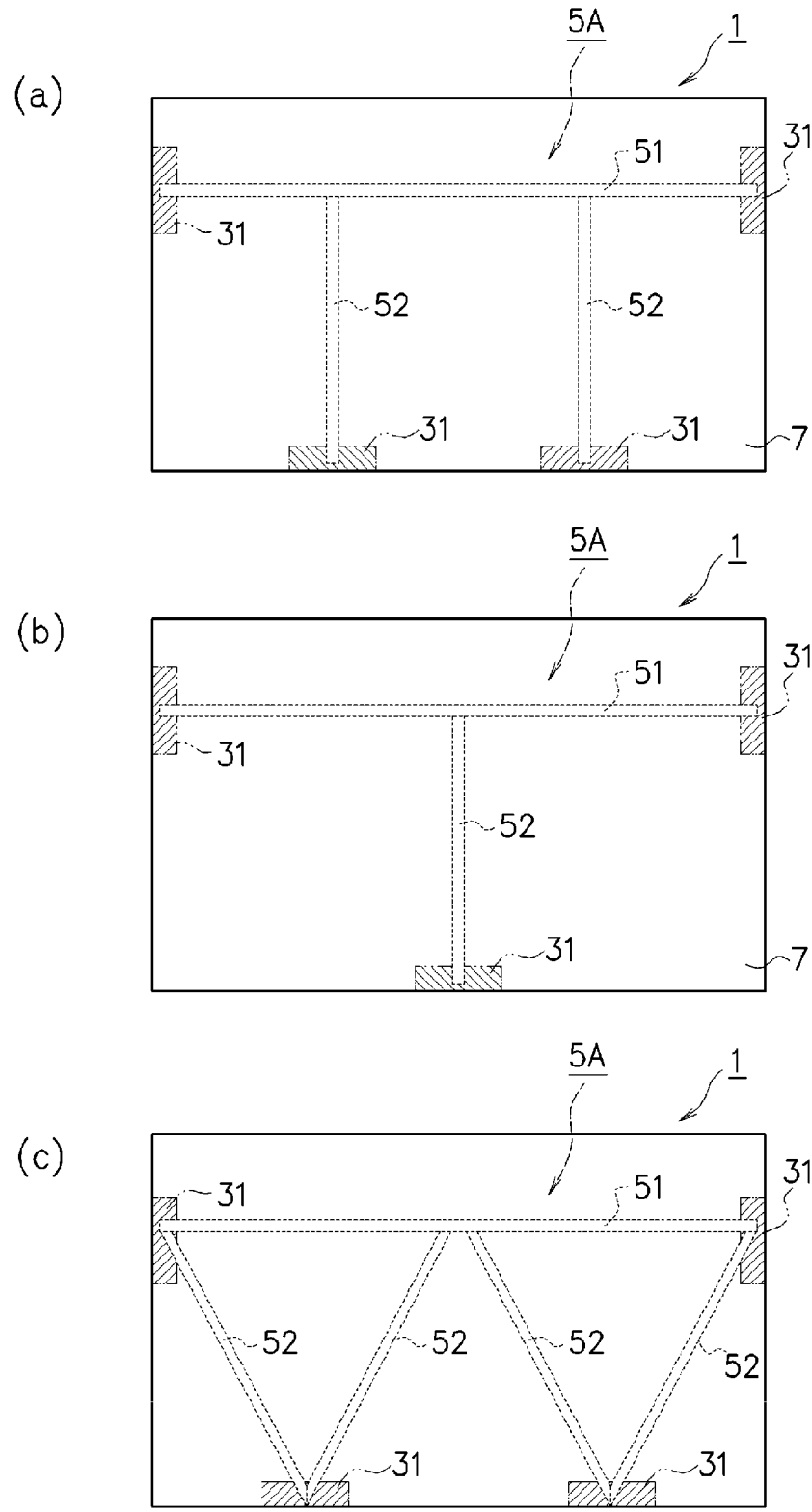
FIG. 33 is a diagram showing an example configuration of another resin panel 1 of the second embodiment.

First, referring to FIG. 12, FIG. 15 to FIG. 23, FIG. 33, a summary of the resin panel 1 of the present embodiment will be described. FIG. 12, FIG. 33 show an example configuration of the resin panel 1 of the present embodiment, and FIG. 15 to FIG. 23 show an example method for molding the resin panel 1 shown in FIG. 12, FIG. 33.

As shown in FIG. 12, the resin panel 1 of the present embodiment is a resin panel 1 that abuts against another member (e.g., another member in an automobile) via a predetermined contact surfaces 31. The resin panel 1 of the present embodiment includes: a reinforcement unit 5A, including the first reinforcement (corresponding to the longitudinal reinforcement 51) and the second reinforcement (corresponding to the longitudinal reinforcement 51) placed so as to bridge between contact surfaces 31, and the third reinforcement (corresponding to the lateral reinforcement 52) interposed between the first reinforcement 51 and the second reinforcement 51; and resin bases (corresponding to the front wall 2, the rear wall 3) sandwiching the reinforcement unit 5A therebetween from the upper and lower surfaces of the reinforcement unit 5A.

As shown in FIG. 33, the resin panel 1 of the present embodiment includes: the reinforcement unit 5A, including a first reinforcement (corresponding to the longitudinal reinforcement 51) placed so as to bridge between contact surfaces 31, and a second reinforcement (corresponding to the lateral reinforcement 52) interposed between the first reinforcement 51 and the contact surface 31; and base resins (corresponding to the front wall 2, the rear wall 3) sandwiching the reinforcement unit 5A therebetween from the upper and lower surfaces of the reinforcement unit 5A.

Figure 15:
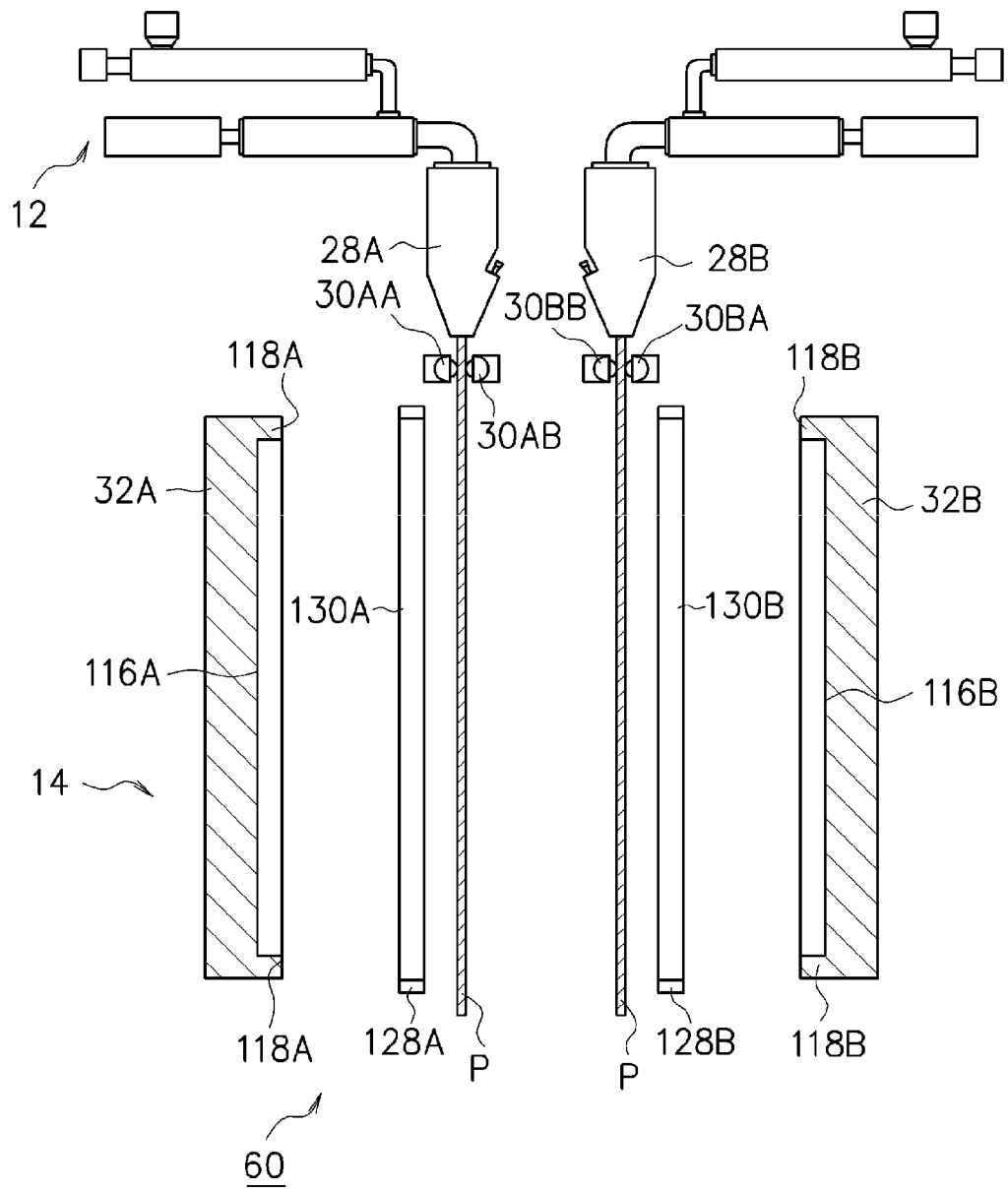
FIG. 15 is a diagram showing an example configuration of the molding apparatus 60 for molding the resin panel 1 of the second embodiment.
Figure 17:
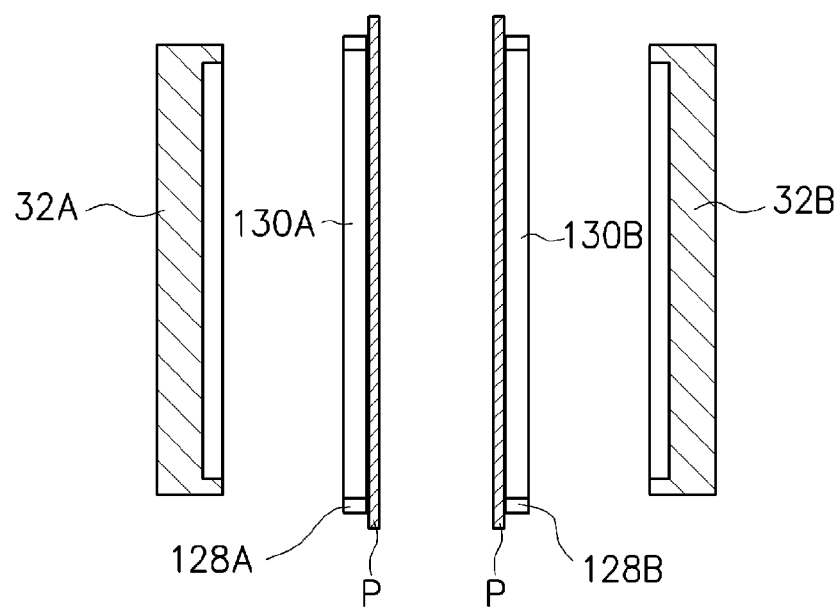
FIG. 17 is a second diagram showing an example step of molding the resin panel 1.
Figure 18:
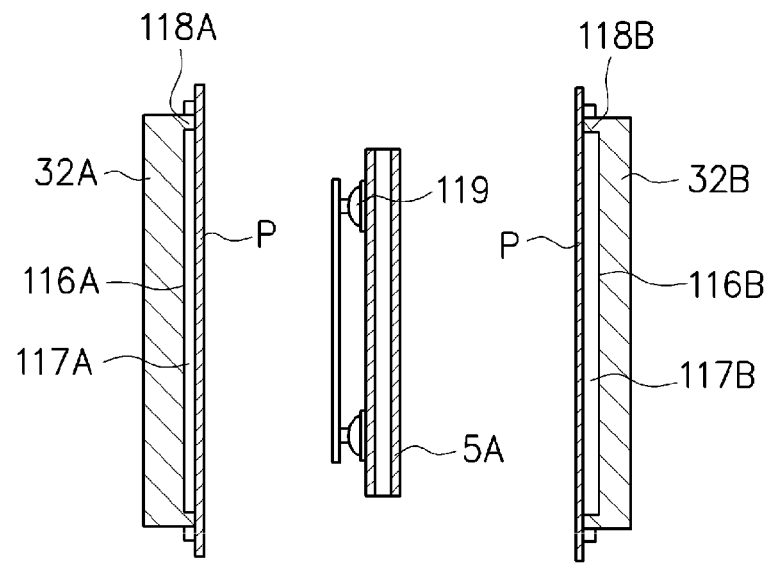
FIG. 18 is a third diagram showing an example step of molding the resin panel 1.
Figure 19:
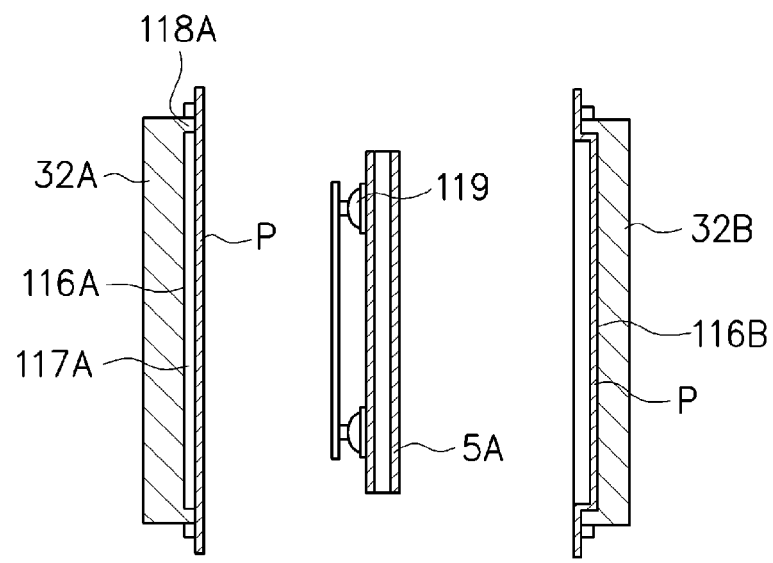
FIG. 19 is a fourth diagram showing an example step of molding the resin panel 1.
Figure 20:
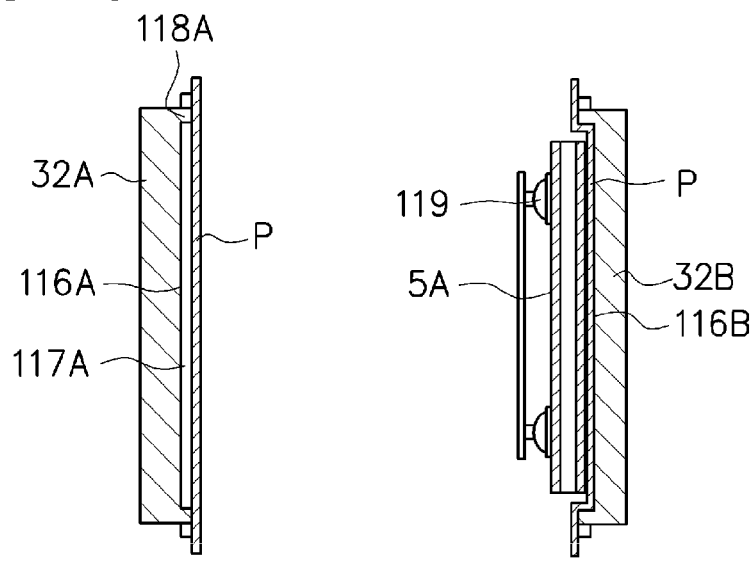
FIG. 20 is a fifth diagram showing an example step of molding the resin panel 1.
Figure 21:
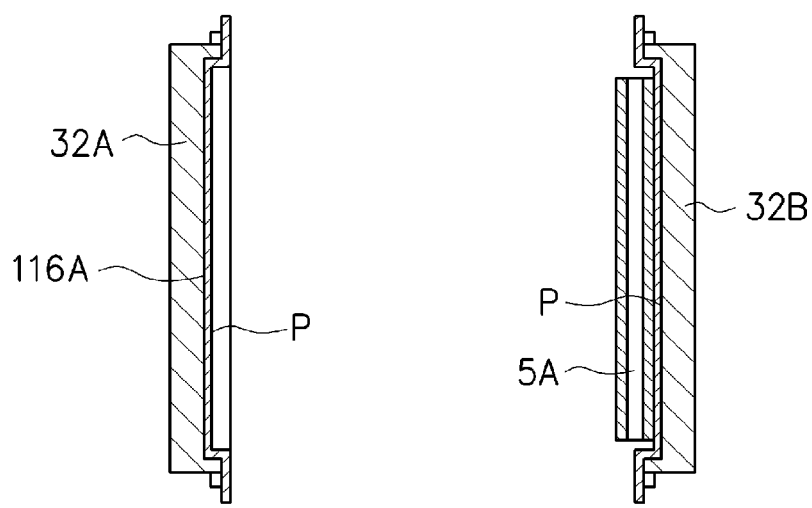
FIG. 21 is a sixth diagram showing an example step of molding the resin panel 1.
Figure 22:
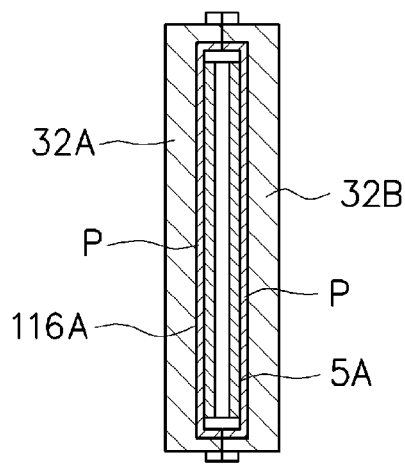
FIG. 22 is a seventh diagram showing an example step of molding the resin panel 1.

The resin panel 1 of the present embodiment shown in FIG. 12, FIG. 33 can be molded through steps shown in FIG. 16 to FIG. 23 using the molding apparatus 60 shown in FIG. 15 and, for example, the molten resin sheet P of the resin base 2, 3 is shaped into a shape conforming to the cavity 116 of the split mold 32 as shown in FIG. 19. Then, as shown in FIG. 20, the reinforcement unit 5A is attached to the resin sheet P, which has been shaped into a shape conforming to the cavity 116. Then, as shown in FIG. 22, the reinforcement unit 5A and the resin sheet P are clamped together by the split mold 32, thereby molding the resin panel 1 shown in FIG. 12, FIG. 33. Thus, it is possible to mold the resin panel 1 having the reinforcement unit 5A in which the reinforcements 51, 52 running in different directions are precisely placed at predetermined positions.

With the molding method of the present embodiment, since the reinforcement unit 5A is attached to the resin sheet P shaped into a shape conforming to the cavity 116, it is possible to precisely place the reinforcement unit 5A, including the reinforcements 51, 52 running in different directions, at a predetermined position, and to mold the resin panel 1 shown in FIG. 12, FIG. 33 with which it is possible to efficiently obtain the mechanical strength. The resin panel 1 of the present embodiment will now be described in detail.

<Example Configuration of Resin Panel 1>

First, referring to FIG. 12, an example configuration of the resin panel 1 of the present embodiment will be described. FIG. 12 shows an example configuration of the resin panel 1, wherein FIG. 12(a) is a general perspective view of the resin panel 1, FIG. 12(b) is a top view of the resin panel 1 shown in FIG. 12(a), FIG. 12(c) is a cross-sectional view taken along A-A' of the resin panel 1 shown in FIGS. 12(a), (b), and FIG. 12(d) is a cross-sectional view taken along B-B' of the resin panel 1 shown in FIGS. 12(a), (b).

As shown in FIG. 12(a), the resin panel 1 of the present embodiment includes the front wall 2, the rear wall 3, the peripheral wall 4, and the reinforcement unit 5A. The reinforcement unit 5A includes the longitudinal reinforcement 51 and the lateral reinforcement 52. As shown in FIGS. 12(c), (d), the resin panel 1 of the present embodiment includes the hollow portion 6 between the front wall 2 and the rear wall 3, and the reinforcement unit 5A is placed between the front wall 2 and the rear wall 3. Note that in the resin panel 1 of the present embodiment, as shown in FIG. 12(d), the end portion of the longitudinal reinforcement 51 is not in contact with the inner side of the peripheral wall 4, with the hollow portion 6 formed between the end portion of the longitudinal reinforcement 51 and the peripheral wall 4. However, the end portion of the longitudinal reinforcement 51 may be in contact with the inner side of the peripheral wall 4, with no hollow portion 6 formed between the end portion of the longitudinal reinforcement 51 and the peripheral wall 4. The peripheral wall 4 is a portion that connects together the front wall 2 and the rear wall 3.

In the resin panel 1 of the present embodiment, the rear wall 3 has contact surfaces 31, and the end portions of the longitudinal reinforcements 51 are placed on the contact surfaces 31. The contact surfaces 31 are portions to be in contact with another member, for example, when the resin panel 1 is placed on the other member in the automobile, and the resin panel 1 is placed on the other member with the contact surfaces 31 being in contact with the other member. Note that while the contact surfaces 31 at opposite ends are each divided into pieces in FIGS. 12(a), (b), the contact surfaces 31 at opposite ends may each be an integral contact surface 31 without being divided into pieces. The positions of the contact surfaces 31 are not limited to the positions shown in FIGS. 12(a), (b), but the contact surfaces 31 may be provided at any positions depending on how the resin panel 1 and another member abut against each other when the resin panel 1 is placed on the other member.

In the resin panel 1 of the present embodiment, the cosmetic member 7 for decorative purposes, or the like, is bonded to the surface of the front wall 2 as shown in FIG. 12(a), thus forming a layered structure of the rear wall 3, the front wall 2 and the cosmetic member 7 as shown in FIGS. 12(c), (d). Note that no cosmetic member 7 may be bonded.

Figure 13:
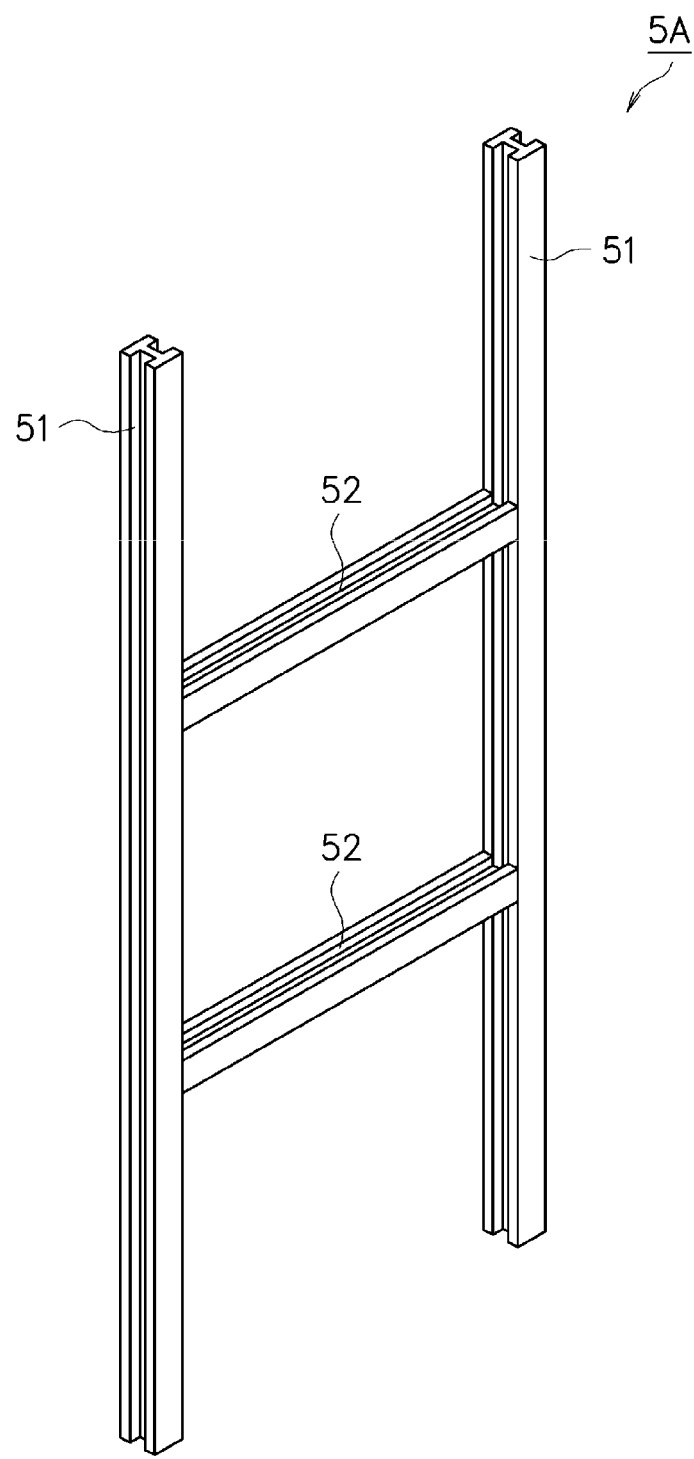
FIG. 13 is a diagram showing an example configuration of a reinforcement unit 5A.

The reinforcement unit 5A of the present embodiment includes the reinforcements 51, 52 running in different directions. Specifically, as shown in FIG. 13, the reinforcement unit 5A is assembled to a ladder shape including two longitudinal reinforcements 51, and two lateral reinforcements 52 bridging between the two longitudinal reinforcements 51. The opposite ends of the lateral reinforcements 52 are connected to the longitudinal reinforcements 51 so as to bridge between the longitudinal reinforcements 51. The method for connecting the opposite ends of the lateral reinforcement 52 to the longitudinal reinforcements 51 is not limited to any particular method, and the connection can be made by, for example, welding, fitting, etc.

Figure 14:
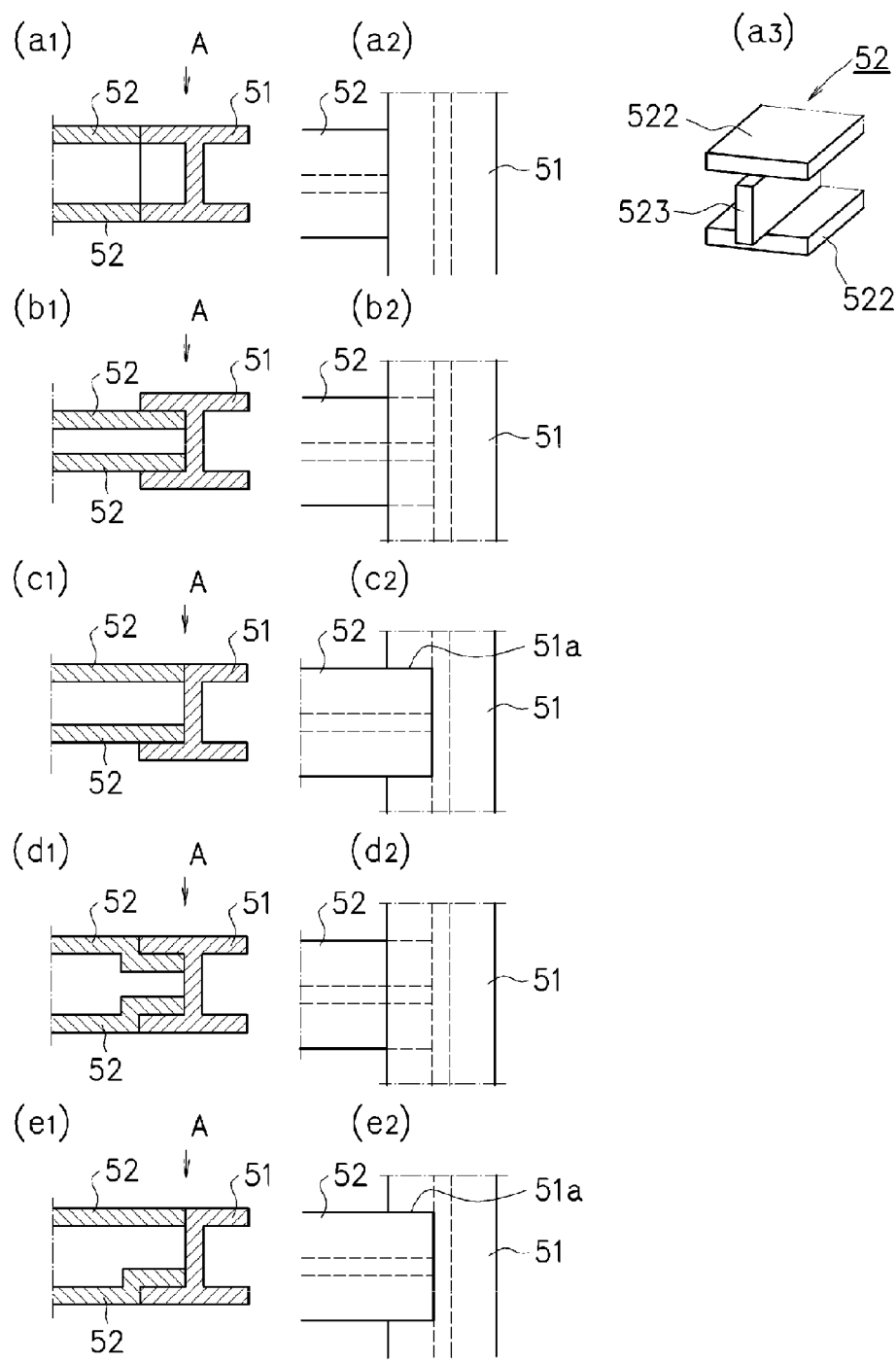
FIG. 14 is a diagram showing an example method for connecting together a longitudinal reinforcement 51 and a lateral reinforcement 52 of the reinforcement unit 5A.

The method for connecting the end portions of the lateral reinforcements 52 to the longitudinal reinforcements 51 may be, for example, an example method of forming the lateral reinforcement 52 and the longitudinal reinforcement 51 in shapes shown in FIG. 14. FIG. 14 shows example configurations of the connection portion between the lateral reinforcement 52 and the longitudinal reinforcement 51 shown in FIG. 13, wherein FIGS. 14(*a*1)-(*e*1) show example cross-sectional configurations of the connection portion between the lateral reinforcement 52 and the longitudinal reinforcement 51, and FIGS. 14(*a*2)-(*e*2) show the connection portions shown in FIGS. 14(*a*1)-(*e*1) as viewed from the direction A. FIG. 14(*a*3) shows a state where end portions of upper and lower surfaces 522 of the lateral reinforcement 52 shown in FIGS. 14(*a*1), (*a*2) are cut off, and the shape of the end portion of the lateral reinforcement 52 is processed into a pillar shape 523. The longitudinal reinforcement 51 and the lateral reinforcement 52 of the reinforcement unit 5A shown in FIG. 13 show a case where they are connected with a configuration shown in FIGS. 14(*a*1), (*a*2). Note that central dotted lines along the longitudinal reinforcement 51 and the lateral reinforcement 52 shown in FIGS. 14(*a*2)-(*e*2) denote pillar shape portions for connecting together upper and lower surfaces in a case where the longitudinal reinforcement 51 and the lateral reinforcement 52 are formed in an H-letter shape.

The configuration of FIGS. 14(*a*1), (*a*2) shows a case where the longitudinal reinforcement 51 and the lateral reinforcement 52 are each formed in an H-letter shape, and the longitudinal reinforcement 51 and the lateral reinforcement 52 are formed with the same height. With the configuration of FIGS. 14(*a*1), (*a*2), end portions of the lateral reinforcement 52 are brought into contact with, and welded to, the longitudinal reinforcement 51, thereby connecting together the longitudinal reinforcement 51 and the lateral reinforcement 52. With the configuration of FIGS. 14(*a*1), (*a*2), since the positions of the upper portion and the lower portion of the longitudinal reinforcement 51 can be matched with those of the lateral reinforcement 52, there will be no steps in the upper portion and the lower portion between the longitudinal reinforcement 51 and the lateral reinforcement 52, and a flat surface will be formed. Note that with the configuration of FIGS. 14(*a*1), (*a*2), since the longitudinal reinforcement 51 is formed in an H-letter shape, the lateral reinforcement 52 and the longitudinal reinforcement 51 are not in contact with each other and there is produced a gap therebetween, over an area on the side of the longitudinal reinforcement 51 with respect to the position at which the end portion of the lateral reinforcement 52 and the longitudinal reinforcement 51 are connected together shown in FIGS. 14(*a*1), (*a*2). Therefore, with the configuration of FIGS. 14(*a*1), (*a*2), end portions of the upper and lower surfaces 522 of the H-letter shape of the lateral reinforcement 52 may be cut off and the shape of the end portion of the lateral reinforcement 52 may be processed into the pillar shape 523 as shown in FIG. 14(*a*3); the end portion of the lateral reinforcement 52 processed into the pillar shape 523 may be inserted inside the longitudinal reinforcement 51, and the longitudinal reinforcement 51 and the H-shaped lateral reinforcement 52 may be brought into contact and welded together, thus connecting together the longitudinal reinforcement 51 and the lateral reinforcement 52. Then, the end portion of the lateral reinforcement 52 processed into the pillar shape 523 is hidden by the longitudinal reinforcement 51, and the end portion of the lateral reinforcement 52 contacts along one side surface of the longitudinal reinforcement 51, thereby preventing the production of the gap described above.

The configuration of FIGS. 14(*b*1), (*b*2) shows a case where the longitudinal reinforcement 51 and the lateral reinforcement 52 are each formed in an H-letter shape, and the lateral reinforcement 52 has such a height that the top and the bottom of the lateral reinforcement 52 adjoin the inside of the longitudinal reinforcement 51. With the configuration of FIGS. 14(*b*1), (*b*2), the lateral reinforcement 52 and the longitudinal reinforcement 51 are connected together by inserting the end portion of the lateral reinforcement 52 into the inside of the longitudinal reinforcement 51. With the configuration of FIGS. 14(*b*1), (*b*2), the end portion of the lateral reinforcement 52 is hidden by the longitudinal reinforcement 51. Since the positions of the upper portion and the lower portion of the longitudinal reinforcement 51 cannot be matched with those of the lateral reinforcement 52, there will be a step in the upper portion and the lower portion between the longitudinal reinforcement 51 and the lateral reinforcement 52.

The configuration of FIGS. 14(*c*1), (*c*2) shows a case where the longitudinal reinforcement 51 and the lateral reinforcement 52 are each formed in an H-letter shape, and the longitudinal reinforcement 51 is formed with an opening 51*a* in the upper portion over the area where it is connected to the lateral reinforcement 52. With the configuration of FIGS. 14(*c*1), (*c*2), the lateral reinforcement 52 and the longitudinal reinforcement 51 are connected together by inserting the end portion of the lateral reinforcement 52 into the inside of the longitudinal reinforcement 51. With the configuration of FIGS. 14(*c*1), (*c*2), the upper portion of the lateral reinforcement 52 is exposed through the opening 51*a* of the longitudinal reinforcement 51. Since the position of the upper portion of the longitudinal reinforcement 51 can be matched with the position of the upper portion of the lateral reinforcement 52 but the position of the lower portion of the longitudinal reinforcement 51 cannot be matched with the position of the lower portion of the lateral reinforcement 52, there will be a step in the lower portion between the longitudinal reinforcement 51 and the lateral reinforcement 52.

With the configuration of FIGS. 14(*d*1), (*d*2), the longitudinal reinforcement 51 and the lateral reinforcement 52 are each formed in an H-letter shape, and the lateral reinforcement 52 has such a height that the top and the bottom of the end portion of the lateral reinforcement 52 adjoin the inside of the longitudinal reinforcement 51. With the configuration of FIGS. 14(*d*1), (*d*2), the lateral reinforcement 52 and the longitudinal reinforcement 51 are connected together by inserting the end portion of the lateral reinforcement 52 into the inside of the longitudinal reinforcement 51. With the configuration of FIGS. 14(*d*1), (*d*2), the end portion of the lateral reinforcement 52 is hidden by the longitudinal reinforcement 51. Since the position of the upper portion of the longitudinal reinforcement 51 can be matched with the position of the upper portion of the lateral reinforcement 52 other than the end portion thereof, and the position of the lower portion of the longitudinal reinforcement 51 can be matched with the position of the lower portion of the lateral reinforcement 52 other than the end portion thereof, there will be no steps in the upper portion and the lower portion between the longitudinal reinforcement 51 and the lateral reinforcement 52, and a flat surface will be formed.

The configuration of FIGS. 14(*e*1), (*e*2) shows a case where the longitudinal reinforcement 51 and the lateral reinforcement 52 are each formed in an H-letter shape, and the longitudinal reinforcement 51 is formed with an opening 51*a* in the upper portion over the area where it is connected to the lateral reinforcement 52. With the configuration of FIGS. 14(*e*1), (*e*2), the lateral reinforcement 52 and the longitudinal reinforcement 51 are connected together by inserting the end portion of the lateral reinforcement 52 into the inside of the longitudinal reinforcement 51. With the configuration of FIGS. 14(*e*1), (*e*2), the upper portion of the lateral reinforcement 52 is exposed through the opening 51*a* of the longitudinal reinforcement 51. Since the position of the upper portion of the longitudinal reinforcement 51 can be matched with the position of the upper portion of the lateral reinforcement 52, and the position of the lower portion of the longitudinal reinforcement 51 can be matched with the position of the lower portion of the lateral reinforcement 52 other than the end portion thereof, there will be no steps in the lower portion between the longitudinal reinforcement 51 and the lateral reinforcement 52, and a flat surface will be formed. Note that the configuration shown in FIG. 14 is a preferred example, and it is not intended to limit the present invention to the configuration shown in FIG. 14.

In the reinforcement unit 5A of the present embodiment, as shown in FIG. 12, the two longitudinal reinforcements 51 are placed so that the end portions thereof are located on the contact surfaces 31 of the resin panel 1, and the two lateral reinforcements 52 are placed so as to bridge between the two longitudinal reinforcements 51. It is preferred that the lateral reinforcements 52 are placed at equal intervals in order to improve the mechanical strength. The material of the longitudinal reinforcement 51 and the lateral reinforcement 52 constituting the reinforcement unit 5A is not limited to any particular material, and any known material can be used. For example, a metal (e.g., aluminum) or a rigid plastic may be used. Note that in order to improve the mechanical strength while reducing the weight of the resin panel 1, it is preferred that the longitudinal reinforcements 51 placed on the contact surfaces 31 are formed by a metal, and the lateral reinforcements 52 bridging between the longitudinal reinforcements 51 are formed by a rigid plastic. The shape of the longitudinal reinforcement 51 and the lateral reinforcement 52 is not limited to an H-letter shape, and it may be cylindrical, C-shaped, U-shaped, etc., as long as the longitudinal reinforcement 51 and the lateral reinforcement 52 can be connected together.

<Example Method for Molding Resin Panel 1>

Next, referring to FIG. 15 to FIG. 23, an example method for molding the resin panel 1 of the present embodiment will be described. FIG. 15 shows an example configuration of the molding apparatus 60 for molding the resin panel 1, and FIG. 16 to FIG. 23 show example steps of molding the resin panel 1.

The resin panel 1 of the present embodiment can be molded by using the molding apparatus 60 shown in FIG. 15. The molding apparatus 60 shown in FIG. 15 includes the extruder 12 and the clamper 14 for forwarding the molten resin sheet P having been extruded from the extruder 12 into the clamper 14, blow-molding the resin sheet P in the clamper 14, and molding the resin panel 1 shown in FIG. 12. An example method for molding the resin panel 1 of the present embodiment will now be described in detail.

Figure 16:
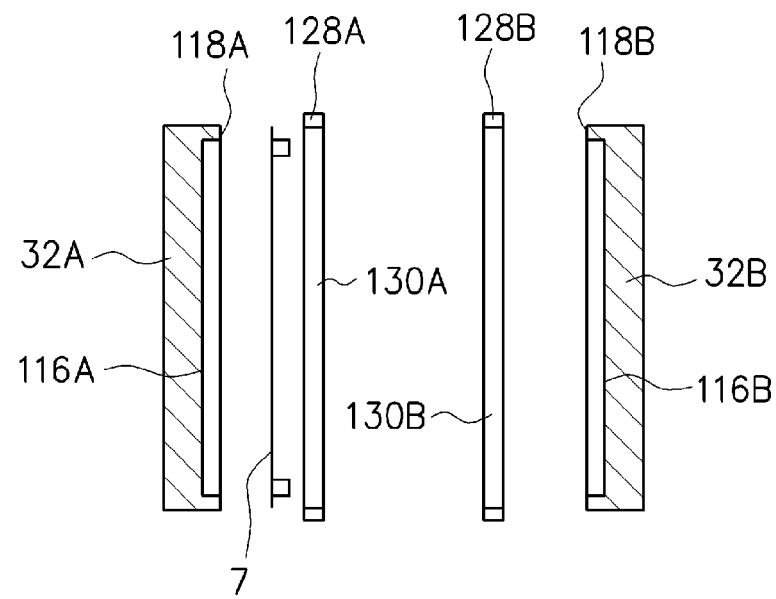
FIG. 16 is a first diagram showing an example step of molding the resin panel 1.

First, as shown in FIG. 16, a sheet-shaped cosmetic member 7 is inserted between one split mold 32A and one frame member 128A on the front side, and the sheet-shaped cosmetic member 7 is temporarily tacked with a tacking pin (not shown) provided on the one split mold 32A so as to cover the cavity 116A of the one split mold 32A.

Next, as shown in FIG. 15, the resin sheet P is extruded from the T-die 28 of the extruder 12, and the extruded resin sheet P is passed through the pair of rollers 30 to adjust the wall thickness of the resin sheet P so that the extruded resin sheet P hangs down between the pair of split molds 32.

With the molding apparatus 60 of the present embodiment, the relative speed difference between the extrusion speed of the resin sheet P and the forwarding speed at which the resin sheet P is downwardly forwarded by the pair of rollers 30 is adjusted by using the rotational speed of the pair of rollers 30, and when the resin sheet P passes between the pair of rollers 30, it is pulled downwardly by the pair of rollers 30, thereby drawing and thinning the resin sheet P, thus preventing drawdown or neck-in.

Where the resin sheet P is placed between the split molds 32, the frame member 128 is moved toward the resin sheet P by a frame member driver (not shown) so that the frame member 128 abuts against the resin sheet P, thus holding the resin sheet P with the frame member 128, as shown in FIG. 17. The frame member 128 has the opening 130, and the resin sheet P is held by the frame member 128.

Next, the frame member 128 is moved toward the split mold 32, so that the resin sheet P abuts against the pinch-off portion 118 of the split mold 32 as shown in FIG. 18, thereby forming the closed space 117 by the resin sheet P, the pinch-off portion 118 and the cavity 116. The reinforcement 5A (see FIG. 13) held by the suction pad 119 of a manipulator (not shown) is inserted between the split molds 32 as shown in FIG. 18. Note that the reinforcement 5A shown in FIG. 18 represents the reinforcement 5A shown in FIG. 13 as viewed from the side surface. While FIG. 18 shows a state where the longitudinal reinforcement 51 is held by the suction pad 119 along the longitudinal direction of the longitudinal reinforcement 51 of the reinforcement unit 5A, the position at which the reinforcement unit 5A is held is not limited to any particular position, and may be held at any position.

Next, the closed space 117B is evacuated through the split mold 32B, and one resin sheet P forming the rear wall 3 is pressed against the cavity 116B, thereby shaping the one resin sheet P forming the rear wall 3 into a shape conforming to the cavity 116B, as shown in FIG. 19.

The manipulator is moved toward the split mold 32B on the right side, and the reinforcement unit 5A is pressed against the one resin sheet P being sucked onto the cavity 116B of the split mold 32B on the right side, as shown in FIG. 20, thereby attaching the reinforcement unit 5A to the one resin sheet P. In this process, the reinforcement unit 5A is attached to the resin sheet P so that the opposite ends of the longitudinal reinforcement 51 of the reinforcement unit 5A are located on the contact surfaces 31 of the rear wall 3 (see FIG. 12).

The resin sheet P of the present embodiment includes a filler, and the filler may be an inorganic or organic filler, wherein in order to obtain the reinforcing effects, fibrous fillers include glass fiber, potassium titanate whisker, carbon fiber, and the like, plate-shaped fillers include talc, mica, montmorillonite, and the like, and granular fillers include calcium carbonate, and the like. Calcium carbonate can provide reinforcing effects such as the flexural modulus, the bending strength, the heat distortion temperature and the dimensional stability. Talc and montmorillonite can provide reinforcing effects such as the flexural modulus, the bending strength, the heat distortion temperature and the dimensional stability. Mica can provide reinforcing effects such as the flexural modulus, the bending strength, the heat distortion temperature, the dimensional stability and the compressive strength. Glass fiber, potassium titanate whisker and carbon fiber can provide reinforcing effects such as the flexural modulus, the bending strength, the tensile modulus, the heat distortion temperature, the dimensional stability and the compressive strength. Thus, in order to obtain reinforcing effects, it is preferred to use a fibrous filler.

The fibrous filler may be, for example, a short fiber having a fiber length of 0.2-0.5 mm, or a long fiber having a fiber length of 3-12 mm. Note that where a fibrous filler is used, the fibrous filler will be oriented in the extrusion direction of the resin sheet P, and it is preferred to extrude the resin sheet P so that the fibrous filler is oriented in the same direction as the longitudinal reinforcement 51 or the lateral reinforcement 52. Thus, it is possible to reduce the weight of the reinforcement in the same direction as the orientation of the fibrous filler.

Next, the suction pad 119 is detached from the reinforcement unit 5A, the manipulator is pulled out from between the two split molds 32, and the other resin sheet P forming the front wall 2 is pressed against the cavity 116A, thereby shaping the other resin sheet P into a shape conforming to the cavity 116A, as shown in FIG. 21.

Next, the two split molds 32 are clamped together using a mold driver, and the reinforcement unit 5A is pressed against the other resin sheet P being sucked onto the cavity 116A of the split mold 32A on the left side, as shown in FIG. 22, thereby attaching the reinforcement unit 5A to the resin sheet P. The peripheries of the two resin sheets P are welded together, thus forming the parting line PL.

Note that in the present embodiment, when the resin panel 1 in which the reinforcement unit 5A and the resin sheet P are integrated together is formed by clamping with the split molds 32, it is preferred to compress together the reinforcement unit 5A and the resin sheet P with the split molds 32. Thus, it is possible to further improve the adhesive strength between the reinforcement unit 5A and the resin sheet P.

Through the steps described above, the resin panel 1 is completed, which is molded by sandwiching reinforcement unit 5A between the molten resin sheets P.

Figure 23:
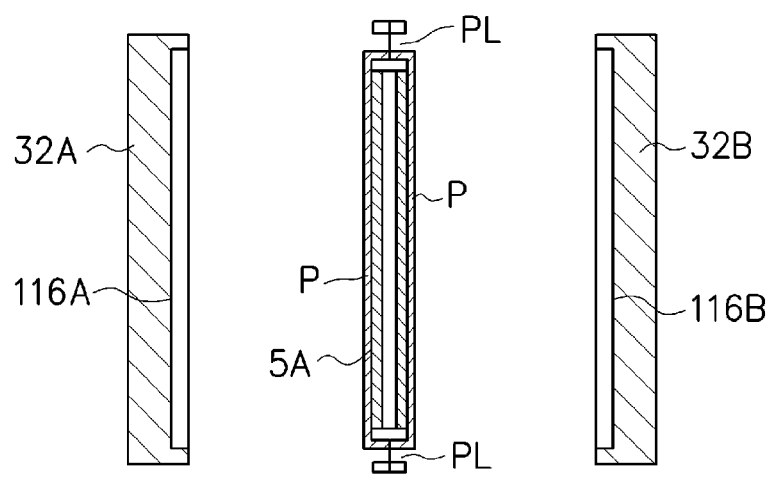
FIG. 23 is an eighth diagram showing an example step of molding the resin panel 1.

Next, as shown in FIG. 23, the two split molds 32 are opened, and the completed resin panel 1 is released from the cavity 116, and burrs formed around the parting line PL are removed. Thus, molding of the resin panel 1 shown in FIG. 12, where the reinforcement unit 5A shown in FIG. 13 is accommodated inside, is completed.

Functions/Effects of Resin Panel 1 of Present Embodiment

As described above, with the resin panel 1 of the present embodiment, the reinforcement unit 5A including the reinforcements 51, 52 running in different directions is attached to the resin sheet P, which has been shaped into a shape conforming to the cavity 116 of the split mold 32, as shown in FIG. 13, and the split molds 32 are closed so as to clamp together the resin sheet P and the reinforcement unit 5A with the split molds 32, thus molding the resin panel 1 shown in FIG. 12 where the reinforcement unit 5A shown in FIG. 13 is accommodated inside. Thus, it is possible to easily mold the resin panel 1 accommodating the reinforcement unit 5A inside, in which the reinforcements 51, 52 running in different directions are precisely placed at predetermined positions.

In the present embodiment, since the reinforcement unit 5A including the reinforcements 51, 52 running in different directions is attached to the resin sheet P, which has been shaped into a shape conforming to the cavity 116 of the split mold 32, even if the reinforcement unit 5A has an unstable shape, the reinforcement unit 5A can be placed precisely inside the resin panel 1. As a result, it is possible to precisely place end portions of the longitudinal reinforcement 51 of the reinforcement unit 5A on the contact surfaces 31. For example, a method disclosed in a patent document (Japanese Patent No. 3221871) uses a supporting device to place a reinforcement at an appropriate position between opened molds. Therefore, with the method disclosed in the patent document, it is difficult to place a reinforcement having an unstable shape or a plurality of separate, individual reinforcements. In contrast, in the present embodiment, since the reinforcement unit 5A is attached to the resin sheet P, even if the reinforcement unit 5A has an unstable shape, the reinforcement unit 5A can be easily attached to the resin sheet P. Even the reinforcement unit 5A including a plurality of separate, individual reinforcements can easily be attached to the resin sheet P. Note however that when the reinforcement unit 5A including a plurality of separate, individual reinforcements is attached to the resin sheet P, the separate, individual reinforcements are attached one after another to the resin sheet P. With the resin panel 1 of the present embodiment, since the reinforcements 51, 52 running in different directions are precisely placed at predetermined positions, it is possible to efficiently obtain the mechanical strength.

Figure 24:
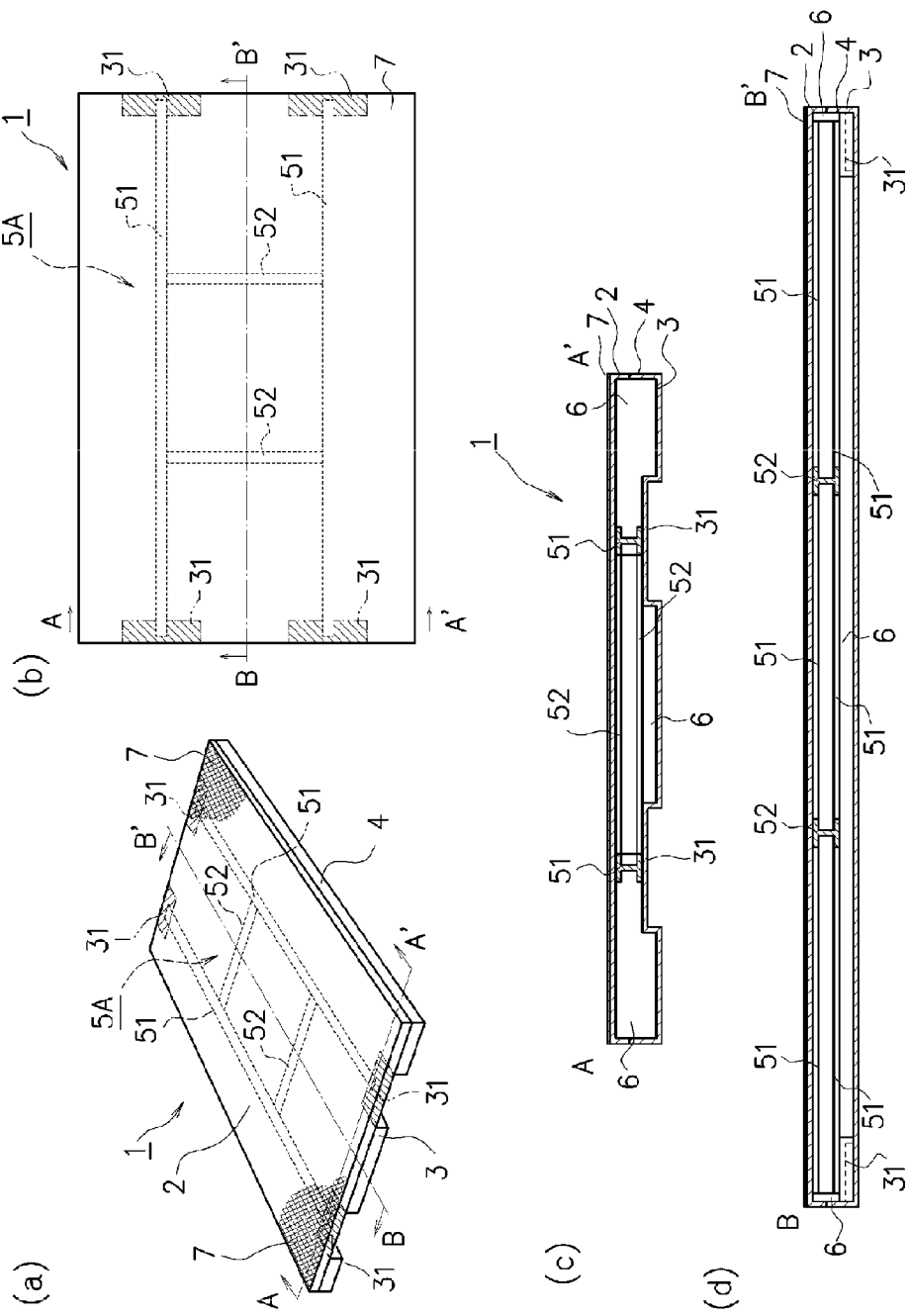
FIG. 24 is a first diagram showing another example configuration of the resin panel 1.

Note that in the resin panel 1 of the embodiment described above, the contact surfaces 31 are formed by the flat surface of the rear wall 3 as shown in FIG. 12. However, as shown in FIG. 24, the contact surfaces 31 may be formed by depressed portions where the rear wall 3 is indented inwardly. FIG. 24(*a*) is a general perspective view of the resin panel 1 where the contact surfaces 31 are formed by depressed portions, FIG. 24(*b*) is a top view of the resin panel 1 shown in FIG. 24(*a*), FIG. 24(*c*) is a cross-sectional view taken along A-A' of FIGS. 24(*a*), (*b*), and FIG. 24(*d*) is a cross-sectional view taken along B-B' of FIGS. 24(*a*), (*b*). In the resin panel 1 having a configuration shown in FIG. 24, the end portions of the longitudinal reinforcement 51 of the reinforcement unit 5A are located on the depressed contact surfaces 31; therefore, when the end portions of the longitudinal reinforcement 51 are placed on the depressed contact surfaces 31, there will be hollow portions 6 between the rear wall 3 and the reinforcement unit 5A (51,52) as shown in FIG. 24. Note however that also with the configuration shown in FIG. 24, it is possible to improve the mechanical strength of the resin panel 1 because the reinforcement unit 5A including the reinforcements 51, 52 running in different directions is placed in the resin panel 1. Note that when the resin panel 1 shown in FIG. 24 is molded, it is preferred that after the reinforcement unit 5A is attached to the resin sheet P forming the front wall 2, the reinforcement unit 5A is attached to the resin sheet P forming the rear wall 3 on which the contact surfaces 31 have been formed. Thus, the resin sheet P and the reinforcement unit 5A can be clamped together with the split molds 32 with the adhesive strength between the resin sheet P and the reinforcement unit 5A having been enhanced, to mold the resin panel 1 shown in FIG. 24.

Figure 25:
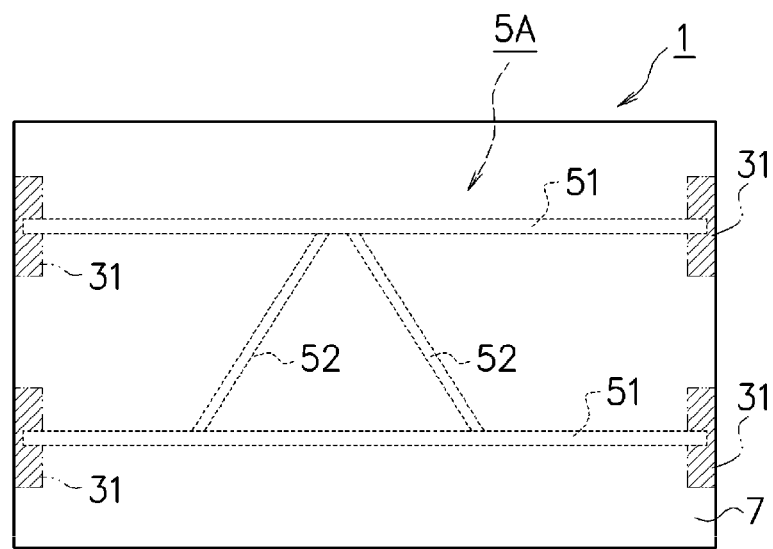
FIG. 25 is a second diagram showing another example configuration of the resin panel 1.

In the embodiment described above, the reinforcements 51, 52 are connected together so as to form a ladder shape including two longitudinal reinforcements 51, and two lateral reinforcements 52 bridging between the two longitudinal reinforcements 51. However, the shape of connection between the longitudinal reinforcements 51 and the lateral reinforcements 52 is not limited to any particular shape as long as the longitudinal reinforcements 51 are located on the contact surfaces 31, and, for example, the reinforcements 51, 52 may be connected together so as to form a triangular shape between the longitudinal reinforcements 51 and the lateral reinforcements 52 as shown in FIG. 25. FIG. 25 shows an example configuration of the resin panel 1 in a case where the shape of the reinforcement unit 5A is changed. When the lateral reinforcements 52 are connected to the longitudinal reinforcements 51, the lateral reinforcements 52 do not need to be connected to the longitudinal reinforcements 51 in such a manner that the lateral reinforcements 52 are in a perpendicular direction to the longitudinal reinforcements 51 as shown in FIG. 12, but the lateral reinforcements 52 may be connected to the longitudinal reinforcements 51 in such a manner that the lateral reinforcements 52 are non-parallel to the longitudinal reinforcements 51 as shown in FIG. 25. Also with the shape of connection shown in FIG. 25, the lateral reinforcements 52 and the longitudinal reinforcements 51 can be connected together with the configuration shown in FIG. 14 described above.

In the embodiment described above, the two lateral reinforcements 52 are provided so as to bridge between the longitudinal reinforcements 51. However, the present invention is not limited to this as long as at least one lateral reinforcement 52 is provided so as to bridge between the longitudinal reinforcements 51, and the number of the lateral reinforcements 52 is not limited to any particular number. The number of the longitudinal reinforcements 51 is not limited to any particular number as long as there are at least two of them. Note that also when three or more longitudinal reinforcements 51 are provided, it is preferred that lateral reinforcements 52 are provided so as to bridge between all of the longitudinal reinforcements 51.

Figure 26:
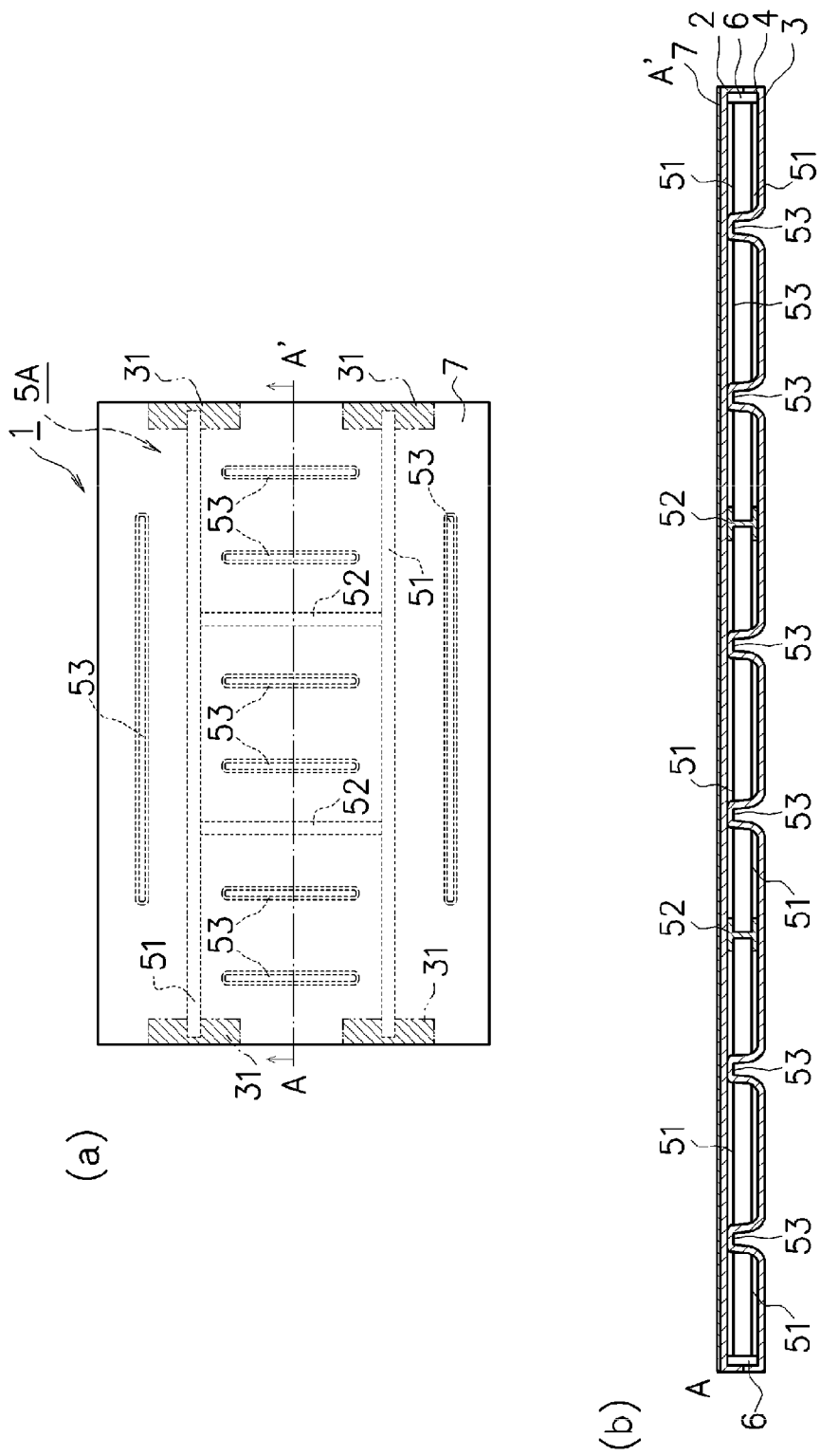
FIG. 26 is a third diagram showing another example configuration of the resin panel 1.

In the embodiment described above, the hollow portions 6 are formed between the rear wall 3 and the front wall 2. However, ribs 53 may be provided in areas of the hollow portions 6, as shown in FIGS. 26(*a*), (*b*), for example. FIG. 26(*a*) shows an example configuration of the resin panel 1 where the ribs 53 are provided, and FIG. 26(*b*) is a cross-sectional view taken along A-A' of FIG. 26(*a*). By providing the ribs 53 as shown in FIGS. 26(*a*), (*b*), it is possible to further improve the mechanical strength of the resin panel 1. Note that the shape of the ribs 53 is not limited to any particular shape, and ribs 53 of any shape may be provided, as long as it is possible to improve the mechanical strength of the resin panel 1. For example, groove-shaped ribs or plate-shaped ribs may be provided. The number of the ribs 53 is also not limited to any particular number, and any number of the ribs 53 may be provided. Note however that it is preferred to provide the ribs 53 running in the same direction as the direction of arrangement of the longitudinal reinforcements 51 or that of the lateral reinforcements 52 of the reinforcement unit 5A as shown in FIG. 26(*a*). Then, it is possible to further enhance the mechanical strength of the resin panel 1 with the reinforcement unit 5A, and the ribs 53 running in the same direction as the direction of arrangement of the longitudinal reinforcements 51 or that of the lateral reinforcements 52 of the reinforcement unit 5. Note that FIG. 26(*a*) shows a case where rectangular ribs 53 running in the same direction as the direction of arrangement of the longitudinal reinforcements 51 or that of the lateral reinforcements 52 of the reinforcement unit 5 are provided. However, instead of the rectangular ribs 53 as shown in FIG. 26(*a*), there may be provided a plurality of circular or elliptical ribs running in the same direction as the direction of arrangement of the longitudinal reinforcements 51 or that of the lateral reinforcements 52 of the reinforcement unit 5A. The ribs 53 shown in FIGS. 26(*a*), (*b*) show an example where they are indented from the rear wall 3 side toward the inner side of the front wall 2. However, they may also be indented from the front wall 2 side toward the inner side of the rear wall 3, or indented from the front wall 2 and from the rear wall 3 toward the center. Also with such rib shapes, instead of forming space areas where the rear wall 3 is indented as shown in FIG. 26(*b*), it is possible to provide a plate-like configuration where the rear walls 3 are in contact with each other in areas where the rear wall 3 is indented. Note that in the resin panel 1 shown in FIG. 24, the contact surfaces 31 of the rear wall 3 are formed by depressed portions, and therefore the hollow portions 6 are provided between the reinforcement unit 5A and the rear wall 3, but the area of the hollow portions 6 between the reinforcement unit 5A and the rear wall 3 can be reduced by providing ribs on the resin panel 1 shown in FIG. 24. In such a case, there are provided ribs that are indented toward the reinforcement unit 5A side from the rear wall 3.

Figure 27:
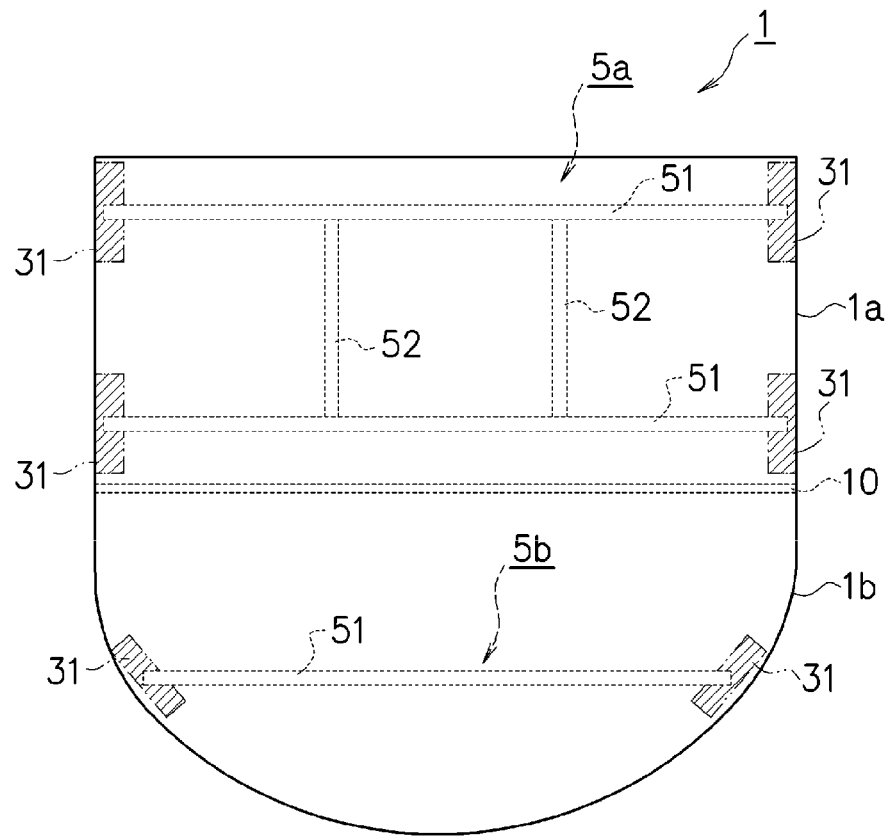
FIG. 27 is a fourth diagram showing another example configuration of the resin panel 1.

The embodiment described above is directed to an example of a single resin panel 1. However, it is also possible to form a resin panel 1 including a first resin panel 1*a* and a second resin panel 1*b* connected together via a hinge portion 10, as shown in FIG. 27. FIG. 27 shows an example configuration of the resin panel 1 in which the two resin panels 1*a*, 1*b* are connected together via the hinge portion 10. The resin panel 1 shown in FIG. 27 can also be molded by using the molding method described above, and a reinforcement unit 5*a* placed in the first resin panel 1*a*, and a second reinforcement unit 5*b* placed in the second resin panel 1*b* (note however that the second reinforcement unit 5*b* is configured solely by the longitudinal reinforcement 51 in FIG. 27) can be easily placed on the molten resin sheet P. As a result, it is possible to easily form the resin panel 1 in which separate, individual reinforcement units 5*a*, 5*b* are placed. For example, with the method disclosed in the patent document (Japanese Patent No. 3221871), it is difficult to place a plurality of separate, individual reinforcement units. In contrast, in the present embodiment, since the reinforcement unit 5A is attached to the resin sheet P, it is possible to easily attach a plurality of separate, individual reinforcement units 5A to the resin sheet P. Note that the shape of the hinge portion 10 is not limited to any particular shape, and the hinge portion 10 of any shape may be molded by using the molding method described above as long as the first resin panel 1*a* and the second resin panel 1*b* are pivotable with respect to each other via the hinge portion 10. Note that a single reinforcement 5 may be placed in the resin panel 1, as shown in FIG. 27.

Figure 28:
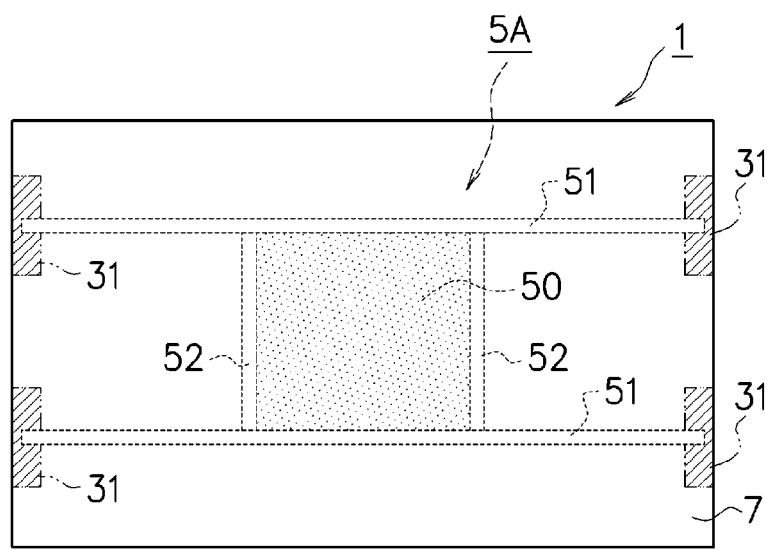
FIG. 28 is a diagram showing an example configuration of another resin panel 1 of the second embodiment.

In the embodiment described above, the reinforcement unit 5A including the reinforcements 51, 52 running in different directions is assembled by contacting, connecting and integrating the longitudinal reinforcements 51 and the lateral reinforcements 52 as shown in FIG. 13. However, as shown in FIG. 28, the reinforcement unit 5A including the reinforcements 51, 52 running in different directions may be assembled by connecting and integrating the longitudinal reinforcements 51 and the lateral reinforcements 52 by means of a foam 50. FIG. 28 shows an example configuration of the resin panel 1 in which the reinforcement unit 5A assembled by using the foam 50 is placed. By assembling the reinforcement unit 5A using the foam 50 as shown in FIG. 28, the reinforcement unit 5A including the reinforcements 51, 52 running in different directions can be assembled without having to bring the longitudinal reinforcements 51 and the lateral reinforcements 52 into contact with each other. Note however that it is possible to improve the mechanical strength of the reinforcement unit 5A by connecting together the longitudinal reinforcements 51 and the lateral reinforcements 52 as in the embodiment described above. Since the longitudinal reinforcements 51 and the lateral reinforcements 52 are fixed together by the foam 50, it is possible to assemble a stable reinforcement unit 5A.

Since the reinforcement unit 5A is formed using the foam 50, the reinforcement unit 5A can be easily attached to the resin sheets P forming the front wall 2 and the rear wall 3. For example, in the embodiment described above, since the reinforcement unit 5A is attached to the resin sheet P, which has been shaped into a shape conforming to the cavity 116B, as shown in FIG. 20, the reinforcement unit 5A and the resin sheet P will be bonded together. In contrast, where the reinforcement unit 5A is formed using the foam 50 and the reinforcement unit 5A is attached to the resin sheet P, the foam 50 will also be attached to the resin sheet P. As a result, it is possible to increase the bonding area between the reinforcement unit 5A and the resin sheet P, and it is possible to further improve the adhesive strength.

Note that the foam 50 may be formed by a known resin, and may include, for example, a styrene-based resin. Note however that at least 30 wt % or more is included. By including a styrene-based resin, it is possible to enhance the rigidity in high-temperature environments (e.g., 90 degrees or more). The styrene-based resin may be an acrylonitrile-styrene copolymer (AS), an acrylonitrile-butadiene-styrene copolymer (ABS), a polystyrene (PS), an impact-resistant polystyrene (HIPS), and the like. It may include an olefin-based resin. The olefin-based resin may be a polypropylene (PP), and the like.

Figure 29:
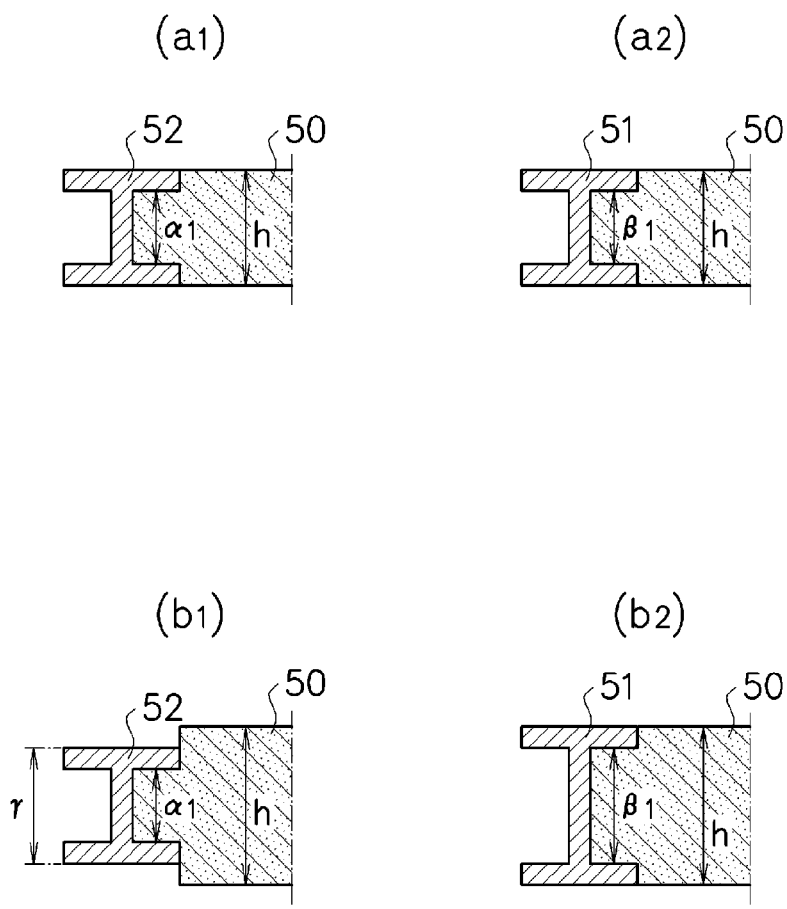
FIG. 29 is a diagram showing an example method for connecting together the lateral reinforcement 52 of the reinforcement unit 5A and a foam 50, and an example method for connecting together the longitudinal reinforcement 51 and the foam 50.

The method for connecting the longitudinal reinforcements 51 and the lateral reinforcements 52 with the foam 50 may be a method of using, for example, shapes shown in FIG. 29. FIGS. 29($a$1), ($b$1) show example configurations of the connection portion between the lateral reinforcement 52 and the foam 50 shown in FIG. 28, and FIGS. 29($a$2), ($b$2) show example configurations of the connection portion between the longitudinal reinforcement 51 and the foam 50 shown in FIG. 28. Note that the connection method shown in FIG. 29 is a preferred example, and the present invention is not limited to the connection method shown in FIG. 29, but any connection method may be used.

The configuration of FIGS. 29($a$1), ($a$2) shows a case where the longitudinal reinforcement 51 and the lateral reinforcement 52 are each formed in an H-letter shape, and the longitudinal reinforcement 51, the lateral reinforcement 52 and the foam 50 have the same height h. The configuration of FIGS. 29($a$1), ($a$2) is such that the height $\alpha$1 of the connection portion between the lateral reinforcement 52 and the foam 50 is equal to the height $\beta$1 of the connection portion between the longitudinal reinforcement 51 and the foam 50 ($\alpha$1=$\beta$1). Then, after the lateral reinforcement 52 is fitted into a pair of end portions of the foam 50 on one side, the longitudinal reinforcement 51 is fitted into a pair of end portions of the foam 50 on the other side, and the end portion of the lateral reinforcement 52 and the longitudinal reinforcement 51 are welded together as shown in FIGS. 14($a$1), ($a$2), thereby connecting together the longitudinal reinforcement 51 and the lateral reinforcement 52. Thus, since the positions of the upper portion and the lower portion of the longitudinal reinforcement 51, those of the lateral reinforcement 52 and those of the foam 50 can be matched with one another, there will be no steps in the upper portion and the lower portion between the longitudinal reinforcement 51, the lateral reinforcement 52 and the foam 50, and a flat surface will be formed.

The configuration of FIGS. 29($b$1), ($b$2) shows a case where the longitudinal reinforcement 51 and the lateral reinforcement 52 are each formed in an H-letter shape, and the height $\gamma$ of the lateral reinforcement 52 is such a the height $\beta$1 that the top and the bottom of the lateral reinforcement 52 adjoin the inside of the longitudinal reinforcement 51, and the longitudinal reinforcement 51 and the foam 50 have the same height h. With the configuration of FIGS. 29($b$1), ($b$2), the height $\beta$1 of the connection portion between the longitudinal reinforcement 51 and the foam 50 is equal to the height $\gamma$ of the lateral reinforcement 52. Then, after the lateral reinforcement 52 is fitted into a pair of end portions of the foam 50 on one side, the longitudinal reinforcement 51 is fitted into a pair of end portions of the foam 50 on the other side and the end portion of the lateral reinforcement 52, thereby connecting together the longitudinal reinforcement 51 and the lateral reinforcement 52. Where the longitudinal reinforcement 51 is fitted into the end portion of the lateral reinforcement 52, it will be the configuration of FIGS. 14($b$1), ($b$2). Note that with the configuration of FIGS. 29($b$1), ($b$2), the end portion of the lateral reinforcement 52 is hidden by the longitudinal reinforcement 51, as shown in FIG. 14($b$2). Since the positions of the upper portion and the lower portion of the longitudinal reinforcement 51 can be matched with those of the foam 50 but the positions of the upper portion and the lower portion of the lateral reinforcement 52 cannot be matched with those of the longitudinal reinforcement 51 and the foam 50, there will be a step in the upper portion and the lower portion between the lateral reinforcement 52, the longitudinal reinforcement 51 and the foam 50. Note that the configuration shown in FIG. 29 is a preferred example, and it is not intended to limit the present invention to the configuration shown in FIG. 29.

Figure 30:
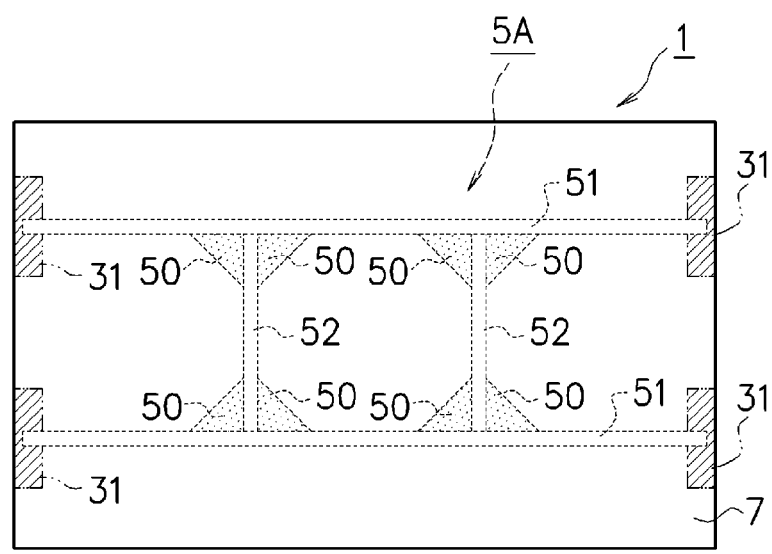
FIG. 30 is a first diagram showing another example configuration of the resin panel 1.

The shape of the foam 50 is not limited to any particular shape as long as the longitudinal reinforcement 51 and the lateral reinforcement 52 can be fixed together, and, for example, it may be such a shape that it contacts the longitudinal reinforcement 51 and the lateral reinforcement 52 as shown in FIG. 30. In this case, the configuration includes a plurality of foams 50. FIG. 30 shows an example configuration of the resin panel 1 in which the reinforcement unit 5A assembled by using a plurality of foams 50 is placed. With the configuration shown in FIG. 30, since the area of the foam 50 can be reduced as compared with the configuration shown in FIG. 28, it is possible to reduce the weight of the resin panel 1. Also with the configuration shown in FIG. 30, the longitudinal reinforcement 51 and the lateral reinforcement 52 can be connected together using the foam 50 by the method shown in FIG. 29 described above.

Figure 31:
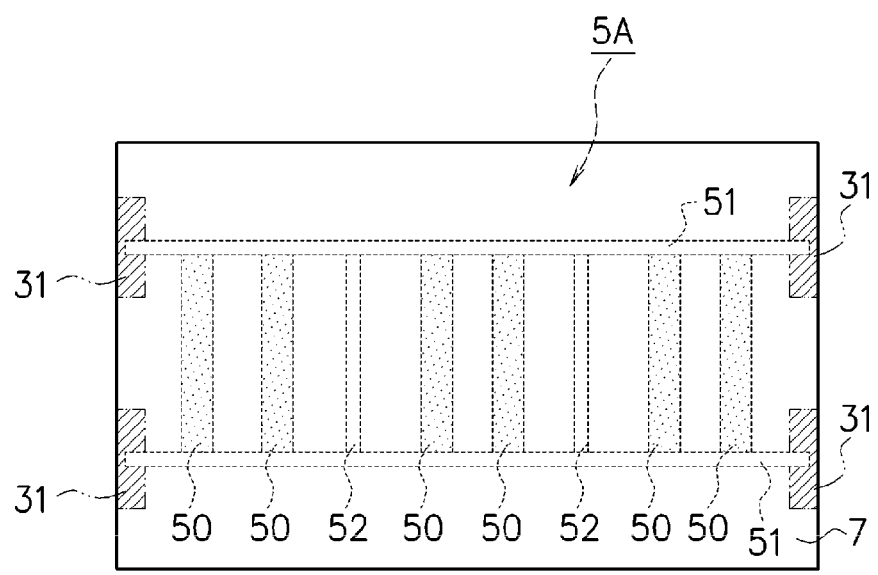
FIG. 31 is a second diagram showing another example configuration of the resin panel 1.

For example, the shape of the foam 50 may be such a shape that it contacts the two longitudinal reinforcements 51 as shown in FIG. 31. Also in such a case, the configuration includes a plurality of foams 50. FIG. 31 shows an example configuration of the resin panel 1 in which the reinforcement unit 5A assembled by using a plurality of foams 50 is placed. Also with the configuration shown in FIG. 31, as with the configuration shown in FIG. 30 described above, it is possible to reduce the area of the foam 50, and it is therefore possible to reduce the weight of the resin panel 1. Since the foam 50 is provided so as to bridge between the two longitudinal reinforcements 51, it is possible to improve the mechanical strength of the resin panel 1 as compared with the configuration shown in FIG. 30.

Figure 32:
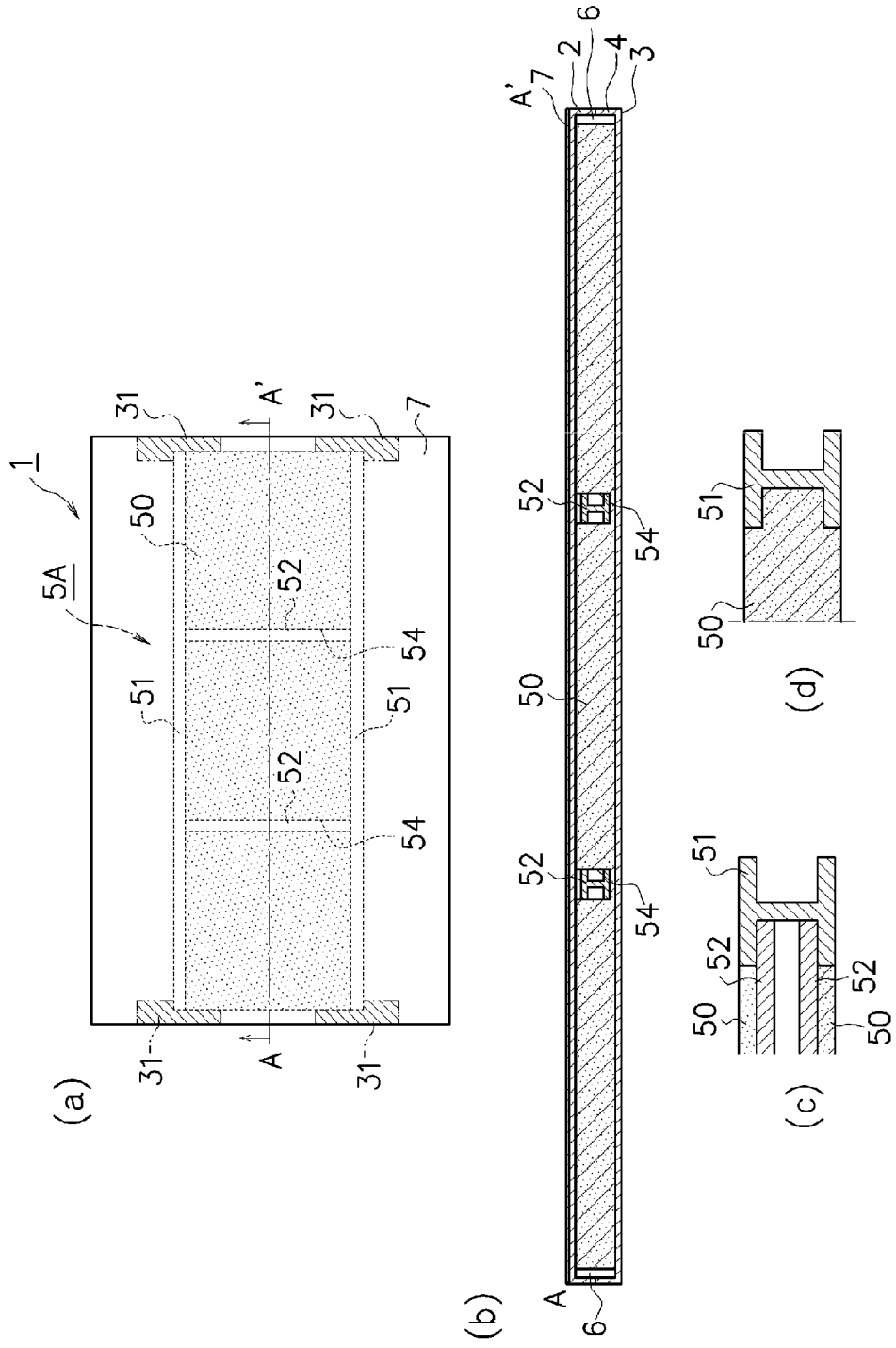
FIG. 32 is a third diagram showing another example configuration of the resin panel 1.

The shape of the foam 50 may be such a shape that the lateral reinforcements 52 are accommodated therein as shown in FIG. 32($a$). FIG. 32 shows an example configuration of the resin panel 1 in which the reinforcement unit 5A assembled by using a single large foam 50 is placed. As shown in FIG. 32($b$), the resin panel 1 shown in FIG. 32($a$) can be formed by forming a single large foam 50 with accommodating sections 54 for accommodating the lateral reinforcements 52, fitting the lateral reinforcements 52 into the formed accommodating sections 54, and fitting the longitudinal reinforcement 51 into end portions of the foam 50 into which the lateral reinforcements 52 have been fitted, as shown in FIGS. 32($c$), ($d$). FIG. 32($b$) shows an enlarged example configuration of a cross section taken along A-A' of FIG. 32(a), FIG. 32(c) shows an example configuration of the connection portion between the lateral reinforcement 52 and the longitudinal reinforcement 51 shown in FIG. 32(a), and FIG. 32(d) shows an example configuration of the connection portion between the foam 50 and the longitudinal reinforcement 51 shown in FIG. 32(a). In FIG. 32(c), the end portion of the lateral reinforcement 52 projects from the accommodating section 54 of the foam 50, and the projecting end portion of the lateral reinforcement 52 is inserted inside the longitudinal reinforcement 51, thereby connecting together the lateral reinforcement 52 and the longitudinal reinforcement 51. Note that in FIG. 32(c), the end portion of the lateral reinforcement 52 does not need to project from the accommodating section 54 of the foam 50. In such a case, the foam 50 and the longitudinal reinforcement 51 may be bonded together. In FIG. 32(d), the end portion of the foam 50 is formed in a protruding shape, and the end portion of the protruding shape is inserted inside the longitudinal reinforcement 51, thereby connecting together the foam 50 and the longitudinal reinforcement 51. Note that the resin panel 1 of the configuration shown in FIG. 32(a) may be formed by using a plurality of foams 50 having the configuration shown in FIG. 28.

Note that in a case where the resin panel 1 is molded by using the reinforcement unit 5A having the configuration shown in FIG. 28, FIG. 30, FIG. 31, FIG. 32, the reinforcement unit 5A may be inserted between the split molds 32 after forming the closed space 117 by the resin sheet P, the pinch-off portion 118 and the cavity 116 as shown in FIG. 18 as with the example molding method described above, but since the reinforcement unit 5A includes the foam 50, it is preferred that the reinforcement unit 5A shown in FIG. 28, FIG. 30, FIG. 31, FIG. 32 is inserted in advance between the split molds 32 before the resin sheet P is extruded from the T-die 28 between the split molds 32 as shown in FIG. 15. Thus, the surface of the foam 50 of the reinforcement unit 5A can be warmed by the heat of the resin sheet P extruded from the T-die 28.

In a case where the resin panel 1 is molded by using the reinforcement unit 5A having the configuration shown in FIG. 28, FIG. 30, FIG. 31, FIG. 32, two resin sheets P may be placed between the split molds 32 and then the reinforcement unit 5A may be attached to the two resin sheets P one after another, as in the example molding method described above, but two resin sheets P may be separately placed on the split molds 32 and the reinforcement unit 5A may be attached to the two resin sheets P one after another. Specifically, first, one resin sheet P is placed on the split mold 32, the resin sheet P is shaped into a shape conforming to the cavity 116 of the split mold 32, and the reinforcement unit 5A is attached to the resin sheet P. The other resin sheet P is placed on the split mold 32, the resin sheet P is shaped into a shape conforming to the cavity 116 of the split mold 32, and the reinforcement unit 5A is attached to the resin sheet P. Then, since it is possible to shorten the amount of time before the reinforcement unit 5A is attached to the resin sheet P extruded from the T-die 28, it is made more likely that the surface of the foam 50 of the reinforcement unit 5A is melted with the heat of the resin sheet P. As a result, the reinforcement unit 5A can be easily attached to the resin sheet P.

In a case where the resin panel 1 is molded by using the reinforcement unit 5A having the configuration shown in FIG. 28, FIG. 30, FIG. 31, FIG. 32, the reinforcement unit 5A can be attached to the resin sheet P while melting the surface of the foam 50 of the reinforcement unit 5A with the heat of the resin sheet P by using the example molding method described above. However, in the example molding method described above, the surface of the foam 50 of the reinforcement unit 5A may be warmed by a heating means such as an infrared heater before the reinforcement unit 5A is inserted between the split molds 32. Note that when to warm the surface of the foam 50 with a heating means is not limited to any particular point in time, and the surface of the foam 50 may be warmed at any point in time as long as it is before welding together the resin sheet P and the reinforcement unit 5A.

Thus, in the embodiment described above, the reinforcement unit 5A including the reinforcements 51, 52 running in different directions is assembled by connecting and integrating together the longitudinal reinforcement 51 and the lateral reinforcement 52 with the foam 50. Then, the reinforcement unit 5A assembled with the foam 50 described above is attached to the resin sheet P, which has been shaped into a shape conforming to the cavity 116 of the split mold 32, and the split molds 32 are closed to clamp together the resin sheet P and the reinforcement unit 5A with the split molds 32, thereby molding the resin panel 1 in which the reinforcement unit 5A is accommodated inside. Thus, it is possible to easily mold the resin panel 1 in which the reinforcement unit 5A including the reinforcements 51, 52 running in different directions is accommodated inside. With the foam 50, it is possible to easily attach the reinforcement unit 5A to the resin sheet P. Since the longitudinal reinforcement 51 and the lateral reinforcement 52 are connected together with the foam 50, it is possible to obtain a stable reinforcement unit 5A.

In the embodiment described above, as shown in FIG. 12, FIG. 32, etc., the reinforcement unit 5A including the reinforcements 51, 52 running in different directions is placed in the resin panel 1 by interposing the lateral reinforcement 52 between a plurality of longitudinal reinforcements 51, 51 arranged on the contact surfaces 31 on opposite sides.

However, as shown in FIGS. 33(a)-(c), the reinforcement unit 5A including the reinforcements 51, 52 running in different directions may be placed in the resin panel 1 by providing the lateral reinforcement 52 within the longitudinal extent of a single longitudinal reinforcement 51 placed on the contact surfaces 31 on opposite sides. Note however that in such a case, the lateral reinforcement 52 of the reinforcement unit 5A is also placed on the contact surface 31. Thus, as in the embodiment described above, it is possible to efficiently improve the mechanical strength of the resin panel 1. FIG. 33 shows an example configuration of the resin panel 1 in which the reinforcement unit 5A is placed, the reinforcement unit 5A including the longitudinal reinforcement 51 placed so as to bridge between the contact surfaces 31 on opposite sides, and the lateral reinforcements 52 interposed between the longitudinal reinforcement 51 and the contact surfaces 31.

Note that the position or shape of the lateral reinforcement 52 of the reinforcement unit 5A is not limited to any particular position or shape as long as the lateral reinforcement 52 is continuous with the longitudinal reinforcement 51 and is placed on the contact surface(s) 31. If the lateral reinforcement 52 is continuous with the longitudinal reinforcement 51 and placed on the contact surface(s) 31, it is possible to efficiently improve the mechanical strength of the resin panel 1 with the longitudinal reinforcement 51 and the lateral reinforcement(s) 52. Note that since the lateral reinforcement 52 is placed on the contact surface(s) 31, the longitudinal reinforcement 51 and the lateral reinforcement 52 are preferably formed by a metal. The position of the contact surface 31 is not limited to the position shown in FIGS. 33(a)-(c), but may be any position depending on how the resin panel 1 and another member abut against each other when the resin panel 1 is placed on the other member. In such a case, the reinforcement unit 5A is assembled by changing the positions of the longitudinal reinforcement 51 and the lateral reinforcement(s) 52 depending on the position of the contact surfaces 31 of the resin panel 1. The method for connecting together the longitudinal reinforcement 51 and the lateral reinforcement(s) 52 shown in FIGS. 33(a), (b) may be the method shown in FIG. 3, or the like. The method for connecting together the longitudinal reinforcement 51 and the lateral reinforcements 52 shown in FIG. 33(c), and the method for connecting together the lateral reinforcements 52 may also be the method shown in FIG. 14, or the like. Note however that with the configuration of the reinforcement unit 5A shown in FIG. 33(c), the shape of the connection portion between the longitudinal reinforcement 51 and the lateral reinforcement 52 and the shape of the connection portion between the lateral reinforcements 52 need to be processed as necessary depending on how they are connected together.

Note that the reinforcement unit 5A shown in FIGS. 33(a)-(c) includes the longitudinal reinforcement 51 and the lateral reinforcement(s) 52 running in different directions. However, the reinforcement unit 5A shown in FIGS. 33(a)-(c) may be assembled with the foam 50. In such a case, the longitudinal reinforcement 51 and the lateral reinforcement(s) 52 are fixed together with the foam 50. Note that the shape of the foam 50 may be any of the shapes shown in FIG. 28, FIG. 30, FIG. 31, etc., as long as the longitudinal reinforcement 51 and the lateral reinforcement 52 can be fixed together. The method for connecting together the longitudinal reinforcement 51 and the foam 50 and the method for connecting together the lateral reinforcement 52 and the foam 50 are also not limited to any particular method, and, for example, may be the method shown in FIG. 29, or the like.

Note that the resin panel 1 shown in FIG. 33 may be molded by a method similar to the embodiment described above; for example, the resin panel 1 in which the reinforcement unit 5A shown in FIGS. 33(a)-(c) is accommodated inside can be molded by attaching the reinforcement unit 5A including the reinforcements 51, 52 running in different directions shown in FIGS. 33(a)-(c) to the resin sheet P, which has been shaped into a shape conforming to the cavity 116 of the split mold 32, and closing the split molds 32 to clamp together the resin sheet P and the reinforcement unit 5A with the split molds 32. In the resin panel 1 shown in FIG. 33, since the lateral reinforcement 52 is provided within the longitudinal extent of the longitudinal reinforcement 51 placed on the contact surfaces 31, and the lateral reinforcement 52 is also placed on the contact surface(s) 31, it is possible to efficiently improve the mechanical strength of the resin panel 1. Thus, it is possible to efficiently improve the mechanical strength of the resin panel 1 by using the reinforcement unit 5A including the longitudinal reinforcement 51 placed so as to bridge between the contact surfaces 31, and the lateral reinforcement 52 interposed between the longitudinal reinforcement 51 and the contact surface 31.

The resin panel 1 of the embodiment described above is molded by sandwiching the reinforcement unit 5A between two resin sheets P. However, the resin panel 1 of the present embodiment is not limited to this as long as it is molded with the reinforcement unit 5A sandwiched by at least two resin sheets P, and, for example, it may be molded with the reinforcement unit 5A sandwiched by four resin sheets P. The layer configuration of the resin panel 1 in such a case is: resin sheet/resin sheet/reinforcement unit/resin sheet/resin sheet.

The resin panel 1 of the embodiment described above has such a configuration that the hollow portions 6 are provided inside the resin panel 1. However, instead of providing the hollow portions 6, the inside of the resin panel 1 may be made solid entirely by using the foam 50. For example, the resin panel 1 may be molded by forming the accommodating section 54 for accommodating the reinforcement unit 5A shown in FIG. 13 in one large foam 50, fitting the reinforcement unit 5A into the accommodating section 54, and using the foam 50 with the reinforcement unit 5A fitted therein as the reinforcement unit 5A used in the example molding method described above. Then, it is possible to mold the resin panel 1 in which the foam 50, accommodating therein the reinforcement unit 5A including the reinforcements 51, 52 running in different directions shown in FIG. 13, is covered by the resin sheets P forming the front wall 2 and the rear wall 3.

Note that the embodiments described above are preferred embodiments of the present invention, with no intention to limit the scope of the present invention to the embodiments described above, and various modifications can be made thereto without departing from the spirit of the present invention.

REFERENCE SIGNS LIST

1 Resin panel
2 Front wall
3 Rear wall
3a, 53 Rib
31 Contact surface
4 Peripheral wall
5 Reinforcement
5A Reinforcement unit
51 Longitudinal reinforcement
52 Lateral reinforcement
51a Opening
6 Hollow portion
7 Cosmetic member
10 Hinge portion
50 Foam
54 Accommodating section

The invention claimed is:

1. A resin panel comprising a rear wall having a plurality of contact surfaces to be in contact with another member, and a front wall opposing the rear wall with an interval therebetween,
   the resin panel comprising a plurality of rectangular ribs being part of a rear wall indented towards the front wall and the rectangular ribs being welded to an inner surface of the front wall, wherein:
   a reinforcement placed so as to bridge between the contact surfaces and the entirety of the reinforcement is positioned between the front wall and the rear wall, and the rectangular ribs are formed non-parallel to the reinforcement, and
   the rectangular ribs are formed of a resin, and the reinforcement is formed of a metal.

2. The resin panel of claim 1, wherein:
   the reinforcement is provided so as to pass through adjacent two of the rectangular ribs which are aligned in a longitudinal direction of the rectangular ribs.

3. The resin panel of claim 1, wherein:
a pair of the reinforcements are provided so as to extend in a first direction, and the rectangular ribs are provided so as to extend in a second direction, the second direction being non-parallel to the first direction.

4. The resin panel of claim 1, wherein:
surfaces of the rectangular ribs and the front wall welded together are flat.

5. The resin panel of claim 1, wherein:
a wall thickness of the front wall is generally equal to or smaller than a wall thickness of the rear wall.

6. The resin panel of claim 1, wherein:
the front wall is lighter than the rear wall.

7. The resin panel of claim 1, wherein:
an average wall thickness of the front wall is 1.2 mm or less; and
an average wall thickness of the rear wall is 1.7 mm or less.

8. The resin panel of claim 1, wherein:
the rear wall is formed by a material having a higher moldability than the front wall.

9. The resin panel of claim 8, wherein:
the front wall includes a base resin and a filler; and
a content of the filler of the rear wall is smaller than that of the front wall.

10. The resin panel of claim 1, wherein:
a reinforcement unit is provided between the front wall and the rear wall, the reinforcement unit including a first reinforcement and a second reinforcement placed so as to bridge between the contact surfaces, and a third reinforcement interposed between the first reinforcement and the second reinforcement.

11. The resin panel of claim 10, wherein:
the reinforcement unit is assembled by fixing at least one of a pair of the first reinforcement and the second reinforcement, a pair of the first reinforcement and the third reinforcement, and a pair of the second reinforcement and the third reinforcement together using a foam.

12. The resin panel of claim 1, wherein:
a reinforcement unit is provided between the front wall and the rear wall, the reinforcement unit including a first reinforcement placed so as to bridge between the contact surfaces, and a second reinforcement interposed between the first reinforcement and the contact surface.

13. The resin panel of claim 12, wherein:
the first reinforcement and the second reinforcement are fixed together by a foam.

14. The resin panel of claim 1, wherein the front wall has a shape with smaller protrusions/depressions than the ribs of the rear wall.

* * * * *